US012627943B2

(12) United States Patent
Sporer

(10) Patent No.: US 12,627,943 B2
(45) Date of Patent: May 12, 2026

(54) SYSTEM AND METHOD FOR HEADPHONE EQUALIZATION AND ROOM ADJUSTMENT FOR BINAURAL PLAYBACK IN AUGMENTED REALITY

(71) Applicant: Fraunhofer-Gesellschaft zur Förderung der angewandten Forschung e.V., Munich (DE)

(72) Inventor: Thomas Sporer, Ilmenau (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 298 days.

(21) Appl. No.: 18/158,724

(22) Filed: Jan. 24, 2023

(65) Prior Publication Data

US 2023/0164509 A1 May 25, 2023

Related U.S. Application Data

(63) Continuation of application No. PCT/EP2021/071151, filed on Jul. 28, 2021.

(30) Foreign Application Priority Data

Jul. 31, 2020 (EP) .................................... 20188945

(51) Int. Cl.
*H04S 7/00* (2006.01)
*H04S 3/00* (2006.01)

(52) U.S. Cl.
CPC .............. *H04S 7/306* (2013.01); *H04S 3/008* (2013.01); *H04S 2400/01* (2013.01); *H04S 2420/01* (2013.01)

(58) Field of Classification Search
CPC .......... H04S 7/304; H04S 7/306; H04S 3/008; H04S 2400/01; H04S 2420/01;
(Continued)

(56) References Cited

U.S. PATENT DOCUMENTS

2006/0045294 A1 3/2006 Smyth
2006/0050908 A1 * 3/2006 Shteyn ...................... H04S 7/30 381/74

(Continued)

FOREIGN PATENT DOCUMENTS

CN 104240695 A 12/2014
CN 105679302 A 6/2016

(Continued)

OTHER PUBLICATIONS

Kousei Tsuchiya, "Sound space rendering and its implementation", Journal of the Acoustical Society of Japan, Dec. 1, 2019, No. 6 in vol. 75, pp. 358-364, Japan.

(Continued)

*Primary Examiner* — Jason R Kurr
(74) *Attorney, Agent, or Firm* — Bridgeway IP Law Group, PLLC; Jihun Kim

(57) ABSTRACT

A system is provided. The system includes an analyzer for determining a plurality of binaural room impulse responses, and a loudspeaker signal generator for generating at least two loudspeaker signals depending on the plurality of binaural room impulse responses and depending on the audio source signal of at least one audio source. The analyzer is configured to determine the plurality of the binaural room impulse responses such that each of the plurality of the binaural room impulse responses considers an effect that results from a headphone being worn by a user.

10 Claims, 11 Drawing Sheets

(58) Field of Classification Search
CPC ..... H04S 7/301; H04S 2400/15; H04R 5/027; H04R 5/033; H04R 25/507; H04R 2225/41
See application file for complete search history.

(56) References Cited

U.S. PATENT DOCUMENTS

| | | | | |
|---|---|---|---|---|
| 2012/0008806 | A1 | 1/2012 | Hess | |
| 2013/0272527 | A1 | 10/2013 | Oomen et al. | |
| 2015/0092965 | A1* | 4/2015 | Umminger | H04S 7/304 381/310 |
| 2015/0195641 | A1 | 7/2015 | Di Censo et al. | |
| 2015/0208190 | A1 | 7/2015 | Hooks et al. | |
| 2017/0078820 | A1 | 3/2017 | Brandenburg et al. | |
| 2017/0195818 | A1 | 7/2017 | Di Censo et al. | |
| 2017/0295445 | A1* | 10/2017 | Christoph | H04S 7/301 |
| 2017/0359467 | A1 | 12/2017 | Norris et al. | |
| 2018/0109900 | A1 | 4/2018 | Scott et al. | |
| 2018/0167745 | A1 | 6/2018 | Rousseau et al. | |
| 2018/0206058 | A1 | 7/2018 | Murata et al. | |
| 2019/0354343 | A1 | 11/2019 | Glaser et al. | |
| 2021/0398545 | A1* | 12/2021 | Johnson | H04S 7/306 |

FOREIGN PATENT DOCUMENTS

| | | | |
|---|---|---|---|
| CN | 107580785 | A | 1/2018 |
| DE | 102014210215 | A1 | 12/2015 |
| EP | 1708543 | A1 | 10/2006 |
| JP | 2008-512015 | A | 4/2008 |
| JP | 2010-050755 | A | 3/2010 |
| JP | 2010-079182 | A | 4/2010 |
| JP | 2012-019506 | A | 1/2012 |
| JP | 2013077872 | A | 4/2013 |
| JP | 2014-505420 | A | 2/2014 |
| JP | 2017-060040 | A | 3/2017 |
| JP | 2017-507550 | A | 3/2017 |
| JP | 2017-092732 | A | 5/2017 |
| KR | 10-2016-0105858 | A | 9/2016 |
| WO | 2015103578 | A1 | 7/2015 |
| WO | 2017197156 | A1 | 11/2017 |

OTHER PUBLICATIONS

Masako Saku, "Office Action for Japanese Application No. 2023-506248", Mar. 31, 2025, JPO, Japan.
Kenya Horikoshi et al., "Development of three-dimensional auditory display with real-time convolution of reflections and head tracking function", Acoustical Society of Japan 2015 Autumn Meeting, The proceedings for Autumn Meeting, CD-ROM [CD-ROM], Japan, Acoustical Society of Japan, Sep. 2015, pp. 691-692.
Rishabh Ranjan et al., "Natural Listening over Headphones in Augmented Reality Using Adaptive Filtering Techniques", IEEE/ACM Transactions on Audio, Speech, and Language Processing U.S. IEEE, Nov. 2015, vol. 23, No. 11, pp. 1988-2002, DOI: 10.1109/TASLP.2015.2460459, ISSN: 2329-9290.
Juri Nakashima, "Office Action for JP Application No. 2023-506248", May 31, 2024, JPO, Japan.
J. Chua et al., "Convolutive blind source separation with low latency", Proc. of IEEE International Workshop on Acoustic Signal Enhancement (IWAENC), (20160900), doi:10.1109/IWAENC.2016.7602895, pp. 1-5, XP032983095, Sep. 2016.
Z. Rafii et al., "An overview of lead and accompaniment separation in music," IEEE/ACM Transactions on Audio, Speech, and Language Processing, (Aug. 2018), vol. 26, No. 8, pp. 1307-1335, Aug. 2018.
F.-R. Stoter et al., "The 2018 signal separation evaluation campaign," in Latent Variable Analysis and Signal Separation, Y. Deville, S. Gannot, R. Mason, M. D. Plumbley, and D. Ward, Eds. Cham: Springer International Publishing, S. 293-305, 2018.
J.-L. Durrieu et al., "A musically motivated midlevel representation for pitch estimation and musical audio source separation", Selected Topics in Signal Processing, IEEE Journal of, (2011), vol. 5, No. 6, doi:10.1109/ISTSP.2011.2158801, pp. 1180-1191, XP011386718, 2011.
S. Uhich et al., "Improving music source separation based on deep neural networks through data augmentation and network blending," in Proc. of IEEE International Conference on Acoustics, Speech and Signal Processing (ICASSP), 2017.
P. N. Samarasinghe et al., "Recent advances in active noise control inside automobile cabins: Toward quieter cars", IEEE Signal Processing Magazine, (Nov. 2016), vol. 33, No. 6, doi:10.1109/MSP.2016.2601942, pp. 61-73, XP011633441, Nov. 2016.
G. S. Papini et al., "Hybrid approach to noise control of industrial exhaust systems," Applied Acoustics, (2017), vol. 125, doi:10.1016/j.apacoust.2017.03.017, pp. 102-112, XP085026079, 2017.
J. Zhang et al. "Active noise control over space: A wave domain approach", IEEE/ACM Transactions on Audio, Speech, and Language Processing, (Apr. 2018), vol. 26, No. 4, pp. 774-786, Apr. 2018.
X. Lu et al., "Speech enhancement based on deep denoising autoencoder," in Proc. of Interspeech, 2013.
Y. Xu et al., "A regression approach to speech enhancement based on deep neural networks," IEEE/ACM Transactions on Audio, Speech, and Language Processing, (Jan. 2015), vol. 23, No. 1, pp. 7-19, Jan. 2015.
S. Pascual et al., "SEGAN: speech enhancement generative adversarial network", Proc. of Interspeech, (Aug. 2017), pp. 3642-3646, Aug. 2017.
F. Weninger et al., "Speech enhancement with LSTM recurrent neural networks and its application to noise-robust ASR", Latent Variable Analysis and Signal Separation; E. Vincent, A. Yeredor, Z. Koldovský, and P. Tichavský, Eds.; Springer International Publishing, Cham, Switzerland, pp. 91-99, 2015.
H. Wierstorf et al., Perceptual evaluation of source separation for remixing music Proc. of Audio Engineering Society Convention, (2017), vol. 143, 2017.
J. Pons et al., "Remixing music using source separation algorithms to improve the musical experience of cochlear implant users", The Journal of the Acoustical Society of America, (2016), vol. 140, No. 6, doi:10.1121/1.4971424, pp. 4338-4349, XP012214619, 2016.
Q. Kong et al., "A joint separation-classification model for sound event detection of weakly labelled data," in Proceedings of IEEE International Conference on Acoustics, Speech and Signal Processing (ICASSP), Mar. 2018.
T. V. Neumann et al., "All-neural online source separation, counting, and diarization for meeting analysis," in Proc. of EEE International Conference on Acoustics, Speech and Signal Processing (ICASSP), (May 2019), pp. 91-95, May 2019.
S. Gharib et al., "Unsupervised adversarial domain adaptation for acoustic scene classification," in Proceedings of the Detection and Classification of Acoustic Scenes and Events Workshop (DCASE), (Nov. 2018), pp. 138-142, Nov. 2018.
A. Mesaros et al., "A multi-device dataset for urban acoustic scene classification," in Proceedings of the Detection and Classification of Acoustic Scenes and Events Workshop, Surrey, UK, 2018.
J. Abesser et al,, "A Distributed Sensor Network for Monitoring Noise Level and Noise Sources in Urban Environments", Proceedings of the 6th IEEE International Conference on Future Internet of Things and Cloud (FiCloud), Barcelona, Spain, (2018), doi:10.1109/FiCloud.2018.00053, pp. 318-324, XP033399745, 2018.
T. Virtanen et al., "Computational Analysis of Sound Scenes and Events", Springer, 2018.
J. Abesser et al., "Acoustic scene classification by combining autoencoder-based dimensionality reduction and convolutional neural net-works", in Proceedings of the 2nd DCASE Workshop on Detection and Classification of Acoustic Scenes and Events, Munich, Germany, 2017.
A. Avni et al., "Spatial perception of sound fields recorded by spherical microphone arrays with varying spatial resolution," Journal of the Acoustic Society of America, (2013), vol. 133, No. 5, doi:10.1121/1.4795780, pp. 2711-2721, XP012173358, 2013.
E. Cano et al., "Evaluation of quality of sound source separation algorithms: Human perception vs quantitative metrics", Proceed-

(56) References Cited

OTHER PUBLICATIONS ings of the 24th European Signal Processing Conference (EUSIPCO), (2016), doi:10.1109/EUSIPCO.2016.7760550, pp. 1758-1762, XP033011238, 2016.
S. Marchand, "Audio scene transformation using informed source separation," The Journal of the Acoustical Society of America, (2016), vol. 140, No. 4, p. 3091, 2016.
S. Grollmisch et al., "Sounding industry: Challenges and datasets for industrial sound analysis (ISA)", in Proceedings of the 27th European Signal Processing Conference (EUSIPCO) (eingereicht), A Coruna, Spain, 2019.
J. Abesser et al., "Fundamental frequency contour classification: A comparison between hand-crafted and CNN-based features, " in Proceedings of the 44th IEEE International Conference on Acoustics, Speech, and Signal Processing (ICASSP), 2019.
J. Abesser et al., "Improving bass saliency estimation using label propagation and transfer learning", in Proceedings of the 19th International Society for Music Information Retrieval Conference (ISMIR), Paris, France, (2018), pp. 306-312, 2018.
C.-R. Nagar et al., "Towards CNN-based acoustic modeling of seventh chords for recognition chord recognition", in Proceedings of the 16th Sound & Music Computing Conference (SMC) (eingereicht), Malaga, Spain, 2019.
J. S. Gomez et al., "Jazz solo instrument classification with convolutional neural networks, source separation, and transfer learning", in Proceedings of the 19th International Society for Music Information Retrieval Conference (ISMIR), Paris, France, (2018), pp. 577-584, 2018.
J. R. Hershey et al., "Deep clustering: Discriminative embeddings for segmentation and separation", Proceedings of the IEEE International Conference on Acoustics, Speech and Signal Processing (ICASSP), (2016), doi:10.1109/ICASSP.2016.7471631, pp. 31-35, XP032900557, 2016.
E. Cano et al., "Pitch-informed solo and accompaniment separation towards its use in music education applications", EURASIP Journal on Advances in Signal Processing, (2014), vol. 23, pp. 1-19, 2014.
S. I. Mimilakis et al., "Monaural Singing Voice Separation with Skip-Filtering Connections and Recurrent Inference of Time-Frequency Mask", Proceedings of the IEEE International Conference on Acoustics, Speech, and Signal Processing (ICASSP), Calgary, Canada, (2018), pp. 721-725, 2018.
J. F. Gemmeke et al., "Audio Set: An ontology and human-labeled dataset for audio events", in Proceedings of the IEEE International Conference on Acoustics, Speech and Signal Processing (ICASSP), New Orleans, USA, 2017.
Kleiner, M., "Acoustics and Audio Technology,". 3rd ed. USA: J. Ross Publishing, 2012.
M. Dickreiter et al., "Handbuch der Tonstudiotechnik", A. medienakademie (Eds). 7th ed. vol. 1. München: K.G. Saur Verlag, 2008.
F. Muller et al., "Transparant hearing", in: CHI ,02 Extended Abstracts on Human Factors in Computing Systems (CHI EA '02), Minneapolis, USA, (Apr. 2002), pp. 730-731, Apr. 2002.
L. VIerira, "Super hearing: a study on virtual prototyping for hearables and hearing aids", Master Thesis, Aalborg University, 2018. Available at: https://projekter.aau.dk/projekter/files/287515943/MasterThesis_Luis.pdf, 2018.
Sennheiser, "AMBEO Smart Headset", [Online]. Available: https://de-de.sennheiser.com/finalstop [Accessed: Mar. 1, 2019].
Orosound, "Tilde Earphones" [Online]. Available: https://www.orosound.com/tilde-earphones/ [Accessed; Mar. 1, 2019].
Brandenburg, K. et al., "Personalized auditory reality," in 44. Jahrestagung für Akustik (DAGA), Garching bei München, Deutsche Gesellschaft für Akustik (DEGA), 2018.
Rishabh Ranjan et al., "Natural listening over headphones in augmented reality using adaptive filtering techniques". IEEE/ACM Transactions on Audio, Speech, and Language Processing, IEEE, USA, (Jul. 31, 2015), vol. 23, No. 11, doi:10.1109/TASLP.2015.2460459, ISSN 2329-9290, pp. 1988-2002, XP058072946, Jul. 31, 2015.
Karolina Prawda, "Augmented Reality: Hear-through", (Dec. 31, 2019), pp. 1-20, URL: https://mycourses.aalto.fi/pluginfile.php/666520/course/section/128564/Karolina%20Prawda_1930001_assignsubmission_file_Prawda_ARA_hear_through_revised.pdf, (Jan. 13, 2021), XP055764823, Oct. 13, 2021.
Cano Estefania et al., "Selective Hearing: A Machine Listening Perspective", 2019 IEEE 21st International Workshop on Multimedia Signal Processing (MMSP), IEEE, (Sep. 27, 2019), doi:10.1109/MMSP.2019.8901720, pp. 1-6, XP033660032, Sep. 27, 2019.
Russell Spencer et al., "Networked Sensory Prosthetics Through Auditory Augmented Reality", AH 2016, Feb. 25-27, 2016, https://dam-prod.media.mit.edu/x/files/pubs/papers/HearThere_AugmentedHuman2016.pdf.
Weinberger Matt, "A startup that raised $50 million to make a smarter version of Apple's Airpods has failed and shut down", https://www.businessinsider.de/why-doppler-labs-shut-down-2017-11?r=US&IR=T.
Gao Ruohan et al., "2.5D Visual Sound", https://ai.facebook.com/blog/visual-sound/.
"Vinci 2.0-World's First Standalone Smart Wireless Headphones", https://www.kickstarter.com/projects/inspero/vinci-20-worlds-first-standalone-ai-sports-headpho?lang=de.
"Starkey Launches Livio AI Hearing Aid with Integrated Sensors and Artificial Intelligence", http://www.hearingreview.com/2018/08/starkey-launches-livio-ai-hearing-aid-integrated-sensors-artificial-intelligence/.
"The Secrets Behind Galaxy Bud's Premium Audio Performance", http://www.samsungmobilepress.com/stories/the-secrets-behind-galaxy-buds-premium-audio-performance.
"Hearable will monitor your brain and body to augment your life", https://spectrum.ieee.org/consumer-electronics/audiovideo/hearables-will-monitor-your-brain-and-body-to-augment-your-life.
"Looking to Listen: Audio-Visual Speech Separation", https://ai.googleblog.com/2018/04/looking-to-listen-audio-visual-speech.html.
"HearThere: Ubiquitous Sonic Overlay", https://www.media.mit.edu/projects/hearthere-ubiquitous-sonic-overlay/overview/.
"HearThere: Environmentally Distributed Perception", https://ger.sh/HearThere.
"Virtual Reality Audio for Cyper Environment VRACE)", https://iwk.mdw.ac.at/?PageId=134, 2 pp.
"Virtual Reality Audio for Cyber Environments Project", https://vrace-etn.eu/, 11 pp.
V. Valimaki et al., "Assisted listening using a headset: Enhancing audio perception in real, augmented, and virtual environments", IEEE Signal Processing Magazine, vol. 32, No. 2, pp. 92-99, XP011573083, Mar. 2015.
K. Brandenburg et al., "Plausible augmentation of auditory scenes using dynamic binaural synthesis for personalized auditory realities," in Proc. of AES International Conference on Audio for Virtual and Augmented Reality, Aug. 2018.
S. Argentieri et al., "A survey on sound source localization in robotics: From binaural to array processing methods", vol. 34, No. 1, pp. 87-112, XP029225205, 2015.
D. Fitzgerald et al., "Projection-based demixing of spatial audio", IEEE/ACM Trans. on Audio, Speech, and Language Processing, vol. 24, No. 9, pp. 1560-1572, Sep. 2016.
E. Cano et al., "Musical source separation: An introduction", IEEE Signal Processing Magazine, (Jan. 2019), vol. 36, No. 1, doi:10.1109/MSP.2018.2874719, pp. 31-40, XP011694891, Jan. 2019.
S. Gannot et al., "A consolidated perspective on multimicrophone speech enhancement and source separation," IEEE/ACM Transactions on Audio, Speech, and Language Processing, vol. 25, No. 4, doi:10.1109/TASLP.2016.2647702, pp. 692-730, XP058372577, Apr. 2017.
E. Cano et al., "Exploring sound source separation for acoustic condition monitoring in industrial scenarios", Proc. of 25th European Signal Processing Conference (EUSIPCO, (Aug. 2017), doi:10.23919/EUSIPCO.2017.8081613, pp. 2264-2268, XP033236389, 2017.
T. Gerkmann et al., "Phase processing for single-channel speech enhancement: History and recent advances", EEE Signal Processing Magazine, vol. 32, No. 2, doi:10.1109/MSP.2014.2369251, pp. 55-66, XP011573073, Mar. 2015.

(56) References Cited

OTHER PUBLICATIONS

E. Vincent et al., "Audio Source Separation and Speech Enhancement", Wiley, 2018.
D. Matz et al., "New sonorities for early jazz recordings using sound source separation and automatic mixing tools," in Proc. of the 16th International Society for Music Information Retrieval Conference. Malaga, Spain: ISMIR, pp. 749-755, Oct. 26-30, 2015.
S. M. Kuo et al., "Active noise control: a tutorial review", Proceedings of the IEEE, (Jun. 1999), vol. 87, No. 6, pp. 943-973, Jun. 1999.
A. Mcpherson et al., "Action-sound latency: Are our tools fast enough?", in Proceedings of the International Conference on New Interfaces for Musical Expression, Jul. 2016.
C. Rottondi et al., "An overview on networked music performance technologies", IEEE Access, vol. 4, pp. 8823-8843, Dec. 2016.
S. Liebich et al., "Signal processing challenges for active noise cancellation headphones", Speech Communication; 13th ITG-Symposium, pp. 1-5, Oct. 2018.
E. Cano et al., "The dimensions of perceptual quality of sound source separation," Proc. of IEEE International Conference on Acoustics, Speech and Signal Processing (ICASSP, (Aug. 2018), doi:10.1109/ICASSP.2018.8462325, pp. 601-605, XP033401636, 2018.
P. M. Delgado et al., "Objective assessment of spatial audio quality using directional loudness maps," Proc. of IEEE International Conference on Acoustics, Speech and Signal Processing (ICASSP, doi:10.1109/ICASSP.2019.8683810, pp. 621-625, XP033566358, May 2019.
C. H. Taal et al., "An algorithm for intelligibility prediction of time-frequency weighted noisy speech", IEEE Transactions on Audio, Speech, and Language Processing, vol. 19, No. 7, doi:10.1109/TASL.2011.2114881, pp. 2125-2136, XP011335558, Sep. 2011.
M. D. Plumbley et al., "Proceedings of the Detection and Classification of Acoustic Scenes and Events 2018 Workshop" (DCASE2018), Tampere University of Technology, Laboratory of Signal Processing, 2018.
R. Serizel et al., "Large- Scale Weakly Labeled Semi-Supervised Sound Event Detection in Domestic Environments," Jul. 2018, submitted to DCASE2018 Workshop, Nov. 19-20, 2018.
L. Jiakai, "Mean teacher convolution system for dcase 2018 task 4," DCASE2018 Challenge, Tech. Rep., Jul. 23, 2018.
G. Parascandolo et al., "Recurrent neural networks for polyphonic sound event detection in real life recordings", Proc. of IEEE International Conference on Acoustics, Speech and Signal Processing (ICASSP, (Mar. 2016), pp. 6440-6444.
E. C, Çakir et al., "End-to-end polyphonic sound event detection using convolutional recurrent neural networks with learned time-frequency representation input", Proc. of International Joint Conference on Neural Networks (IJCNN, (Jul. 2018), pp. 1-7, Jul. 2018.
Y. Xu et al., "Large-Scale Weakly Supervised Audio Classification Using Gated Convolutional Neural Network", Proceedings of the IEEE International Conference on Acoustics, Speech and Signal Processing (ICASSP), Calgary, AB, Canada, (2018), pp. 121-125, 2018.
B. Frenay et al., "Classification in the presence of label noise: A survey", IEEE Transactions on Neural Networks and Learning Systems, vol. 25, No. 5, doi:10.1109/TNNLS.2013.2292894, pp. 845-869, XP011545535, May 2014.
E. Fonseca et al., "Learning sound event classifiers from web audio with noisy labels," in Proceedings of IEEE International Conference on Acoustics, Speech and Signal Processing (ICASSP), Brighton, UK, 2019.
M. Dorfer et al., "Training general-purpose audio tagging networks with noisy labels and iterative self-verification," in Proceedings of the Detection and Classification of Acoustic Scenes and Events 2018 Workshop (DCASE2018), Surrey, UK, 2018.
S. Adavanne et al., "Sound event localization and detection of overlapping sources using convolutional recurrent neural networks", IEEE Journal of Selected Topics in Signal Processing, (2018), pp. 1-1, 2018.
Y. Jung et al., "Joint learning using denoising variational autoencoders for voice activity detection", Proc. of Interspeech, (Sep. 2018), pp. 1210-1214, Sep. 2018.
F. Eyben et al., "Real-life voice activity detection with LSTM recurrent neural networks and an application to hollywood movies", Proc. of IEEE International Conference on Acoustics, Speech and Signal Processing, (May 2013), doi:10.1109/ICASSP.2013.6637694, pp. 483-487, XP032509188, May 2013.
R. Zazo-Candil et al., "Feature learning with raw-waveform CLDNNs for voice activity detection," in Proc. of Interspeech, 2016.
M. Mclaren et al., "Advances in deep neural network approaches to speaker recognition", Proc. of IEEE International Conference on Acoustics, Speech and Signal Processing (ICASSP, (Apr. 2015), pp. 4814-4818, Apr. 2015.
D. Snyder et al., "X-vectors: Robust DNN embeddings for Speaker recognition", Proc. of IEEE International Conference on Acoustics, Speech and Signal Processing (ICASSP, (Apr. 2018), doi:10.1109/ICASSP.2018.8461375, pp. 5329-5333, XP033403941, Apr. 2018.
M. Mclaren et al., "How to train your speaker embeddings extractor," in Odyssey, 2018.
S. O. Sadjadi et al., "The IBM speaker recognition system: Recent advances and error analysis", Proc. of Interspeech, (2016), pp. 3633-3637, 2016.
Y. Han et al., "Deep convolutional neural networks for predominant instrument recognition in polyphonic music", IEEE/ACM Transactions on Audio, Speech, and Language Processing, (Jan. 2017), vol. 25, No. 1, pp. 208-221, Jan. 2017.
V. Longstanlen et al., "Deep convolutional networks on the pitch spiral for musical instrument recognition," Proceedings of the 17th International Society for Music Information Retrieval Conference. New York, USA: ISMIR, pp. 612-618, 2016.
S. Gururani et al., "Instrument activity detection in polyphonic music using deep neural networks," Proceedings of the 19th International Society for Music Information Retrieval Conference. Paris, France: ISMIR, (Sep. 2018), pp. 569-576, Sep. 2018.
J. Schlutter et al., "Zero mean convolutions for level-invariant singing voice detection", in Proceedings of the 19th International Society for Music Information Retrieval Conference. Paris, France: ISMIR, S. 321-326, Sep. 2018.
S. Delikaris-Manias et al., "DOA estimation with histogram analysis of spatially constrained active intensity vectors", Proc. of IEEE International Conference on Acoustics, Speech and Signal Processing (ICASSP), (Mar. 2017), doi:10.1109/ICASSP.2017.7952211, pp. 526-530, XP033258473, Mar. 2017.
S. Chakrabarty et al., "Multi-speaker DOA estimation using deep convolutional networks trained with noise signals", IEEE Journal of Selected Topics in Signal Processing, (Mar. 2019), vol. 13, No. 1, pp. 8-21, Mar. 2019.
X. Li et al., "Multiple-speaker localization based on direct-path features and likelihood maximization with spatial sparsity regularization", IEEE/ACM Transactions on Audio, Speech, and Language Processing, (Oct. 2017), vol. 25, No. 10, pp. 1997-2012, Oct. 2017.
F. Grondin et al., "Lightweight and optimized sound source localization and tracking methods for open and closed microphone array configurations", Robotics and Autonomous Systems, (2019), vol. 113, pp. 63-80, 2019.
D. Yook et al., "Fast sound source localization using two-level search space clustering", IEEE Transactions on Cybernetics, (Jan. 2016), vol. 46, No. 1, doi:10.1109/TCYB.2015.2391252, pp. 20-26, XP011594358, Jan. 2016.
D. Pavlidi et al., "Real-time multiple sound source localization and counting using a circular microphone array", IEEE Transactions on Audio, Speech, and Language Processing, (2013), vol. 21, No. 10, doi:10.1109/TASL.2013.2272524, pp. 2193-2206, XP011521588, 2013.
P. Vecchiotti et al., "End-to-end binaural sound localisation from the raw waveform," in Proc. of IEEE International Conference on Acoustics, Speech and Signal Processing (ICASSP), (May 2019), pp. 451-455, May 2019.
Y. Luo et al., "Speaker-independent speech separation with deep attractor network", IEEE/ACM Transactions on Audio, Speech, and Language Processing, (Apr. 2018), vol. 26, No. 4, pp. 787-796, Apr. 2018.

(56) References Cited

OTHER PUBLICATIONS

Z. Wang et al., "Multi-channel deep clustering: Discriminative spectral and spatial embeddings for speaker-independent speech separation," in Proc. of IEEE International Conference on Acoustics, Speech and Signal Processing (ICASSP), (Apr. 2018), doi:10.1109/ICASSP.2018.8461639, pp. 1-5, XP033400917, Apr. 2018.
G. Naithani et al., "Low latency sound source separation using convolutional recurrent neural networks," in Proc. of IEEE Workshop on Applications of Signal Processing to Audio and Acoustics (WASPAA), (2017), doi:10.1109/WASPAA.2017.8169997, pp. 71-75, XP033264904, 2017.
M. Sunohara et al., "Low-latency real-time blind source separation for hearing aids based on time-domain implementation of online independent vector analysis with truncation of non-causal components," in Proc. of IEEE International Conference on Acoustics, Speech and Signal Processing (ICASSP), (Mar. 2017), pp. 216-220, Mar. 2017.
Y. Luo et al., "TaSNet: Time-domain audio separation network for real-time, single-channel speech separation", Proc. of IEEE International Conference on Acoustics, Speech and Signal Processing (ICASSP), (Apr. 2018), pp. 696-700, Apr. 2018.
Songmei Luo, "Notification of Completion of Formalities for Registration for CN Application No. 202080066342.7", Jan. 13, 2025, CNIPA, China.

* cited by examiner

SYSTEM AND METHOD FOR HEADPHONE EQUALIZATION AND ROOM ADJUSTMENT FOR BINAURAL PLAYBACK IN AUGMENTED REALITY

CROSS-REFERENCES TO RELATED APPLICATIONS

This application is a continuation of copending International Application No. PCT/EP2021/071151, filed Jul. 28, 2021, which is incorporated herein by reference in its entirety, and additionally claims priority from European Application No. EP 20 188 945.8, filed Jul. 31, 2020, which is incorporated herein by reference in its entirety.

BACKGROUND OF THE INVENTION

The present invention relates to headphone equalization and room adaption for binaural reproduction in augmented reality (AR).

Selective hearing (SH) refers to the capability of listeners to direct their attention to a certain sound source or to a plurality of sound sources in their auditory scene. In turn, this implies that the focus of the listeners to uninteresting sources is reduced.

As such, human listeners are capable to communicate in loud environments as well. This usually utilizes different aspects: when hearing with two ears, there are direction-dependent time and level differences and direction-dependent different spectral coloring of the sound. Through the latter, even when hearing with one ear, the sense of hearing is able to determine the direction of a sound source and to separate different sound sources therewith.

Temporal and level differences alone are not sufficient to determine the exact position of a sound source: The locations with the same temporal and level difference are located on a hyperboloid. The resulting ambiguity of the location determination is called cone-of-confusion. In rooms, each sound source is reflected by boundary surfaces. Each of these so-called mirror sources is located on a further hyperboloid. The human sense of hearing combines the information about the direct sound and the associated reflections to a hearing event and resolves the ambiguity of the cone-of-confusion through this. At the same time, the reflections belonging to a sound source increase the perceived loudness of the sound source.

In addition, in the case of natural sound sources, particularly speech, signal portions of different frequencies are temporally coupled. In binaural hearing, all of these aspects are used together. Furthermore, loud sources of disturbance that are well localizable can be actively ignored, so to speak.

In the literature, the concept of selective hearing is related to other terms such as assisted listening [1], virtual and amplified auditory environments [2]. Assisted listening is a broader term that includes virtual, amplified and SH applications.

According to the conventional technology, classical hearing devices mostly operate in a monaural manner, i.e. signal processing for the right and left ears is fully independent with respect to frequency response and dynamic compression. As a consequence, time, level, and frequency differences between the ear signals are lost.

Modern, so-called binaural hearing devices couple the correction factors of the two hearing devices. Often, they have several microphones, however, it is usually only the microphone with the "most speech-like" signal that is selected, but explicit beamforming is not computed. In complex hearing situations, desired and undesired sound signals are amplified in the same way, and a focus on desired sound components is therefore not supported.

In the field of hands-free devices, e.g. for telephones, several microphones are already used today, and so-called beams are computed from the individual microphone signals: sound coming from the direction of the beam is amplified, sound from other directions is reduced. Today's methods learn the constant sound in the background (e.g. engine and wind noise in the car), learn loud disturbances that are well localizable through a further beam, and subtract these from the use signal (example: generalized side lobe canceller). Sometimes, telephone systems use detectors that detect the static properties of speech, suppressing everything that is not structured like speech. In hands-free devices, only a mono signal is transmitted in the end, losing in the transmission path the spatial information that would be interesting to capture the situation and, in particular, to provide the illusion as if "one was there", particularly if several speakers have a mutual call. By suppressing non-speech signals, important information about the acoustical environment of the conversation partner is lost, which can hinder the communication.

By nature, human beings are able to "selectively hear" and consciously focus on individual sound sources in their surroundings. An automatic system for selective hearing by means of artificial intelligence (AI) has to learn the underlying concepts first. Automatic decomposition of acoustical scenes (scene decomposition) first needs detection and classification of all active sound sources, followed by separation so as to be able to further process, amplify, or weaken them as separate audio objects.

The research field of auditory scene analysis tries to detect and classify, on the basis of a recorded audio signal, temporally located sound events such as steps, claps or shouts as well as more global acoustical scenes such as a concert, restaurant, or supermarket. In this case, current methods exclusively use methods of the field of artificial intelligence (AI) and deep learning. This involves data-driven learning of deep neural networks that learn, on the basis of large training quantities, to detect characteristic patterns in the audio signal [70]. Above all, inspired by advances in the research fields of image processing (computer vision) and speech processing (natural language processing), mixtures of convolutional neural networks for two-dimensional pattern detection in spectrogram representations and recurrent layers (recurrent neural networks) for temporal modelling of sounds are used, as a general rule.

For audio analysis, there is a series of specific challenges to be handled. Due to their complexity, deep learning models are very data hungry. In contrast to the research fields of image processing and speech processing, there are only comparably small data sets available for audio processing. The largest data set is the AudioSet data set from Google [83], with approximately 2 million sound examples and 632 different sound event classes, wherein most data sets used in research are significantly smaller. This small amount of training data can be addressed, e.g., with transfer learning, wherein a model that is pre-trained on a large data set is subsequently fine-tuned to a smaller data set with new classes determined for the use case (fine-tuning) [77]. Furthermore, methods from semi-supervised learning are utilized so as to involve, in training, the unannotated audio data generally available in large quantities as well.

A further significant difference compared to image processing is that, in the case of simultaneously hearable acoustical events, there is no masking of sound objects (as is the case with images), but complex phase-dependent overlap. Current algorithms in deep learning use so-called “attention” mechanisms, e.g., enabling the models to focus in the classification on certain time segments or frequency ranges [23]. The detection of sound events is further complicated by the high variance with respect to their duration. Algorithms should be able to robustly detect very short events such as a pistol shot and also long events such as a passing train.

Due to the models' strong dependence on the acoustical conditions in the recording of the training data, they often show an unexpected behavior in new acoustical environments, e.g., which differ with respect to the spatial reverberation or the positioning of the microphones. Different solution approaches to mitigate this problem have been developed. For example, data augmentation methods try to achieve higher robustness and invariance of the models through simulation of different acoustical conditions [68] and artificial overlap of different sound sources. Furthermore, the parameters in complex neural networks can be regulated in a different way so that over-training and specialization on the training data is avoided, simultaneously achieving better generalization to unseen data. In recent years, different algorithms have been proposed for “domain adaption” [67] in order to adapt previously trained models to new application conditions. In the use scenario within a headphone, which is planned in this project, real-time capability of the sound source detection algorithms is of elementary significance. Here, a tradeoff between the complexity of the neural network and the maximum possible number of calculation operations on the underlying computing platform necessarily has to take place. Even if a sound event has a longer duration, it still has to be detected as quickly as possible in order to as to start a corresponding source separation.

At Fraunhofer IDMT, a large amount of research work has been carried out in recent years in the field of automated sound source detection. In the research project “StadtLārm”, a distributed sensor network that can measure noise levels and classify between 14 different acoustical scene and event classes on the basis of recorded audio signals at different locations within a city has been developed [69]. In this case, the processing in the sensors is carried out in real time on the embedded platform raspberry Pi 3. A preceding work examined novel approaches for data compression of spectrograms on the basis of auto encoder networks [71]. Recently, through the use of methods from deep learning in the field of music signal processing (music information retrieval), there have been great advances in applications such as music transcription [76], [77], chord detection [78], and instrument detection [79]. In the field of industrial audio processing, new data sets have been established, and methods of deep learning have been used, e.g., for monitoring an acoustical state of electric motors [75].

The scenario addressed in this embodiment assumes several sound sources whose number and type are initially unknown, and which may constantly change. For the sound source separation, several sources with similar characteristics, such as several speakers, are a particularly great challenge [80].

To achieve a high spatial resolution, several microphones have to be used in the form of an array [72]. In contrast to conventional audio recordings in mono (1 channel) or stereo (2 channels), such a recording scenario enables a precise localization of the sound sources around the listener.

Sound source separation algorithms usually leave behind artifacts such as distortions and crosstalk between the sources [5], which may generally be perceived by the listener as being disturbing. Through re-mixing the tracks, such artifacts can be partly masked and therefore reduced [10].

To enhance “blind” source separation, additional information such as a detected number and type of the sources or their estimated spatial position is often used (informed source separation [74]). For meetings in which several speakers are active, current analysis systems may simultaneously estimate the number of the speakers, determine their respective temporal activity, and subsequently isolate them by means of source separation [66].

At Fraunhofer IDMT, a great amount of research as to the perception-based evaluation of sound source separation algorithms has been performed in recent years [73].

In the field of music signal processing, a real time-capable algorithm for separating the solo instrument as well as the accompanying instruments has been developed, utilizing a base frequency estimation of the solo instrument as additional information [81]. An alternative approach for the separation of singing from complex musical pieces on the basis of deep learning methods has been proposed in [82]. Specialized source separation algorithms have also been developed for the application in the context of the industrial audio analysis [7].

Headphones significantly influence the acoustical perception of the surroundings. Depending on the structure of the headphone, the sound incidence towards the ears is attenuated to a different degree. In-ear headphones fully block the ear channels [85]. Closed headphones that surround the auricle acoustically cut off the listener from the outside environment strongly as well. Open and semi-open headphones allow the sound to fully or partially pass through [84]. In many applications of daily life, it is desired for headphones to isolate the undesired surrounding sounds more strongly than is possible with their construction type.

Interfering influences from outside can additionally be attenuated with active noise control (ANC). This is realized by recording incident sound signals by means of microphones of the headphone and then reproducing them by the loudspeakers such that these sound portions and the sound portions penetrating the headphone cancel each other out by means of interference. Overall, this may achieve strong acoustical isolation from the surroundings. However, in many daily situations, this goes along with dangers, which is why there is the desire to be able to intelligently turn on this function on demand.

First products enable that the microphone signals are passed through into the headphone so as to reduce the passive isolation. Thus, besides prototypes [86], there are already products that advertise with the function of “transparent listening.” For example, Sennheiser provides the function with the AMBEO headset [88] and Bragi with the product “The Dash Pro.” However, this possibility is only the beginning. In the future, this function is to be vastly extended so that in addition to turning on and off surrounding sounds in full, individual signal portions (e.g. only speech or alarm signals) can be made exclusively hearable on demand. The French company Orosound enables the person wearing the headset “Tilde Earphones” [89] to adapt the strength of the ANC with a slider. In addition, the voice of a conversational partner may also be led through during activated ANC. However, this only works if the conversational partner is located face to face in a cone of 60°. Direction-independent adaption is not possible.

The patent application publication US 2015 195641 A1 (cf. [91]) discloses a method implemented to generate a hearing environment for a user. In this case, the method includes receiving a signal representing an ambient hearing environment of the user, processing the signal by using a microprocessor so as to identify at least one sound type of a plurality of sound types in the ambient hearing environment. In addition, the method includes receiving user preferences for each of the plurality of sound types, modifying the signal for each sound type in the ambient hearing environment, and outputting the modified signal to at least one loudspeaker so as to generate a hearing environment for the user.

Headphone equalization and room adaption (or space/spatial adaption or space/spatial compensation) of binaural reproduction in augmented reality (AR) is a significant problem:

In a typical scenario, the human listener wears an acoustically (partially) transparent headphone and hears his/her surroundings through the same. In addition, additional sound sources are reproduced via the headphone, with said sound sources being embedded into the real surroundings such that it is not possible for the listener to distinguish between the real sound scene and the additional sound.

Usually, the direction in which the head is turned and the position of the listener in the room (or space) are determined via tracking (six degrees of freedom (6 DoF)). It is known from research that good results (i.e. externalization and correct localization) are achieved if the room acoustics of the recording and reproduction rooms match or if the recording is adapted to the reproduction room.

In this case, an exemplary solution may be realized as follows:

In a first step, a measurement of the BRIR without headphones is carried out either in an individualized manner or with an artificial head by means of a probe microphone.

In a second step, an analysis of the room characteristics of the recording room is carried out on the basis of the BRIR measured.

In a third step, a measurement of the headphones transfer function is carried out in an individualized manner or with an artificial head by means of a probe microphone at the same location. Through this, the equalization function is determined.

Optionally, in a fourth step, a measurement of the room characteristics of the reproduction room, an analysis of the acoustical characteristics of the reproduction room, and an adaption of the BRIR with respect to the reproduction room may be carried out.

Then, in a further step, a convolution (or folding) of a source to be augmented with the correctly positioned, optionally adapted BRIR is carried out so as to obtain two raw channels. Convolution of the raw channels with the equalization function to obtain the headphone signals.

Finally, in a further step, reproduction of the headphone signals is carried out via headphones.

However, there is a problem in that, when the headphone is put on, the influence of the auricle with respect to the BRIR disappears. That is, the BRIRs are different than without headphones. Through this, natural sound sources sound different than without headphones, however, the virtual augmented sound sources are reproduced as if there was no headphone.

It would be desirable to provide concepts that enable a simple, quick, and efficient determination of the room characteristics of the reproduction room.

SUMMARY

An embodiment may have a system, including: an analyzer for determining a plurality of binaural room impulse responses, a loudspeaker signal generator for generating at least two loudspeaker signals depending on the plurality of binaural room impulse responses and depending on the audio source signal of at least one audio source, wherein the analyzer is configured to determine the plurality of the binaural room impulse responses such that each of the plurality of the binaural room impulse responses considers an effect that results from a headphone being worn by a user.

Another embodiment may have a system for assisting selective hearing, the system including: a detector for detecting an audio source signal portion of one or more audio sources by using at least two received microphone signals of a hearing environment, a position determiner for assigning position information to each of the one or more audio sources, an audio type classifier for allocating an audio signal type to the audio source signal portion of each of the one or more audio sources, a signal portion modifier for varying the audio source signal portion of at least one audio source of the one or more audio sources depending on the audio signal type of the audio source signal portion of the at least one audio source so as to obtain a modified audio signal portion of the at least one audio source, and wherein the analyzer and the loudspeaker signal generator together form a signal generator, wherein the analyzer of the signal generator is configured for generating the plurality of binaural room impulse responses, wherein the plurality of binaural room impulse responses is a plurality of binaural room impulse responses for each audio source of the one or more audio sources that depends on the position information of this audio source and an orientation of a user's head, and wherein the loudspeaker signal generator of the signal generator is configured to generate the at least two loudspeaker signals depending on the plurality of the binaural room impulse responses and depending on the modified audio signal portion of the at least one audio source.

Another embodiment may have a method, including: determining a plurality of binaural room impulse responses, generating at least two loudspeaker signals depending on the plurality of binaural room impulse responses and depending on the audio source signal of at least one audio source, wherein the plurality of the binaural room impulse responses is determined such that each of the plurality of the binaural room impulse responses considers an effect that results from a headphone being worn by a user.

Another embodiment may have a non-transitory digital storage medium having a computer program stored thereon to perform the method, including: determining a plurality of binaural room impulse responses, generating at least two loudspeaker signals depending on the plurality of binaural room impulse responses and depending on the audio source signal of at least one audio source, wherein the plurality of the binaural room impulse responses is determined such that each of the plurality of the binaural room impulse responses considers an effect that results from a headphone being worn by a user, when said computer program is run by a computer.

Embodiments of the invention are provided in the following.

Thus, claim 1 provides a system, claim 9 provides a method, and claim 10 provides a computer program according to embodiments of the invention.

A system according to an embodiment of the invention includes an analyzer for determining a plurality of binaural room impulse responses, and a loudspeaker signal generator for generating at least two loudspeaker signals depending on the plurality of binaural room impulse responses and depending on the audio source signal of at least one audio source. The analyzer is configured to determine the plurality of the binaural room impulse responses such that each of the plurality of the binaural room impulse responses considers an effect that results from a headphone being worn by a user.

In addition, a method according to an embodiment of the invention is provided, the method including:

determining a plurality of binaural room impulse responses. And:

generating at least two loudspeaker signals depending on the plurality of binaural room impulse responses and depending on the audio source signal of at least one audio source.

The plurality of the binaural room impulse responses is determined such that each of the plurality of the binaural room impulse responses considers an effect that results from a headphone being worn by a user.

Furthermore, a computer program according to an embodiment of the invention having a program code for performing the above-described method is provided.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
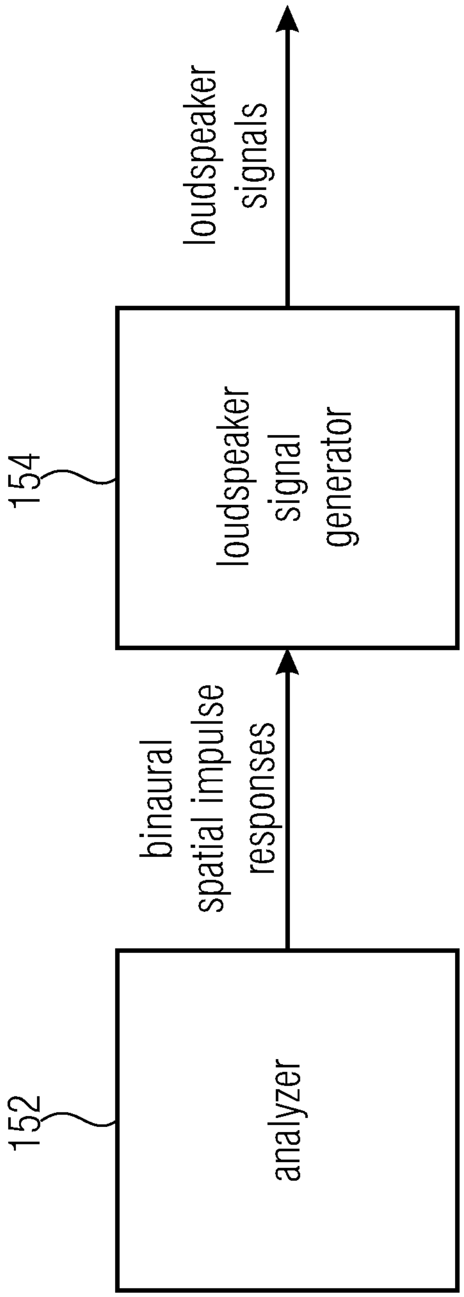
FIG. 1 shows a system according to an embodiment.

FIG. 1 shows a system according to an embodiment.

The system includes an analyzer 152 for determining a plurality of binaural room impulse responses.

In addition, the system includes a loudspeaker signal generator 154 for generating at least two loudspeaker signals depending on the plurality of the binaural room impulse responses and depending on the audio source signal of at least one audio source.

The analyzer 152 is configured to determine the plurality of binaural room impulse responses such that each of the plurality of the binaural room impulse responses considers an effect that results from a headphone being worn by a user.

In an embodiment, e.g., the system may include the headphone, e.g., wherein the headphone may be configured to output at least two loudspeaker signals.

According to an embodiment, e.g., the headphone may include at least two headphone capsules and, e.g., at least one microphone for measuring sound in each of the two headphone capsules, wherein, e.g., the at least one microphone for measuring the sound may be arranged in each of the two headphone capsules. Here, e.g., the analyzer 152 may be configured to perform the determination of the plurality of the binaural room impulse responses by using the measurement of the at least one microphone in each of the two headphone capsules. A headphone that is intended for binaural reproduction comprises at least two headphone capsules (one each for the left and the right ear), wherein more than two capsules (e.g. for different frequency ranges) may be provided as well.

In an embodiment, e.g., the at least one microphone in each of the two headphone capsules may be configured to, prior to reproduction of the at least two loudspeaker signals by the headphone, generate one or more recordings of a sound situation in a reproduction room (or space), determine an estimation of a raw audio signal of at least one audio source from the one or more recordings, and determine a binaural room impulse response of the plurality of the binaural room impulse responses for the audio source in the reproduction room.

According to an embodiment, e.g., the at least one microphone in each of the two headphone capsules may be configured to, during reproduction of the at least two loudspeaker signals by the headphone, generate one or more further recordings of the sound situation in the reproduction room, subtract an augmented signal from these one or more further recordings, and determine the estimation of the raw audio signal from one or more audio sources, and determine the binaural room impulse response of the plurality of the binaural room impulse responses for the audio source in the reproduction room.

In an embodiment, e.g., the analyzer 152 may be configured to determine acoustical room characteristics of the reproduction room and adapt the plurality of the binaural room impulse responses depending on the acoustical room characteristics.

According to an embodiment, e.g., the at least one microphone may be arranged in each of the two headphone capsules for measuring the sound close to the entrance of the ear canal.

In an embodiment, e.g., the system may include one or more further microphones outside of the two headphone capsules for measuring the sound situation in the reproduction room.

According to an embodiment, e.g., the headphone may include a bracket, e.g., wherein at least one of the one or more further microphones is arranged on the bracket.

In an embodiment, e.g., the loudspeaker signal generator 154 may be configured to generate the at least two loudspeaker signals by each of the plurality of the binaural room impulse responses being convoluted with an audio source signal of a plurality of one or more audio source signals.

According to an embodiment, e.g., the analyzer 152 may be configured to determine at least one of the plurality of the binaural room impulse responses (or several or all binaural room impulse responses) depending on a movement of the headphone.

In embodiments, the system may include a sensor to determine a movement of the headphone. For example, the sensor may be a sensor, such as an acceleration pick-up, which comprises at least 3 DoF (three degrees of freedom) so as to capture head turns. For example, a sensor with 6 DoF (six degrees of freedom sensor) may be used.

Certain embodiments of the invention address the technical challenge that it is often very loud in a hearing environment, certain sounds in the hearing environment are disturbing, and selective hearing is desired. While the human brain itself is able to perform selective hearing to a certain degree, intelligent technical assistants may significantly improve selective hearing. In the same way as eyeglasses help many people to better perceive their environment in modern life, there are hearing aids for hearing, however, even people with normal hearing may profit from the assistance by means of intelligent systems in many situations. In order to realize "intelligent hearables" (hearing devices, or hearing aids), the technical system has to analyze the (acoustical) environment and identify individual sound sources so as to be able to process them separately. There is existing research work with respect to this topic, however, analysis and processing of the entire acoustical environment in real time (transparent for our ears) and with high sound quality (for the content heard to not be distinguishable from a normal acoustical environment) has not been realized in the conventional technology.

Improved concepts for machine listening are provided in the following.

In a first step, a measurement of the BRIR with a headphone is carried out either in an individualized manner or with a headphone by means of a probe microphone.

In a second step, an analysis of the room characteristics of the recording room is carried out on the basis of the BRIR measured.

Optionally, e.g., in a third step, prior to reproduction, at least one built-in microphone in each shell records the real sound situation in the reproduction room. From these recordings, an estimation of the raw audio signal of one or more sources is determined, and the respective BRIR of the sound source/audio source in the reproduction room is determined. From this estimation, the acoustical room characteristics of the reproduction room are determined, and the BRIR of the recording room are adapted therewith.

Optionally, e.g., in a further step, during reproduction, at least one built-in microphone in each shell records the real sound situation in the reproduction room. From these recordings, the augmented signal is initially subtracted, an estimation of the raw audio signal of one or more sources is then determined, and the respective BRIR of the sound source/audio source in the reproduction room is determined. From this estimation, the acoustical room characteristics of the reproduction room are determined, and the BRIR of the reproduction room are adapted therewith.

In a further step, convolution of a source to be augmented with the correctly positioned, optionally adapted BRIR is performed so as to obtain the headphone signals.

Finally, in a further step, reproduction of the headphone signals is carried out via the headphone.

In an embodiment, e.g., at least one microphone is arranged in each headphone capsule for measuring the sound close to the entrance of the ear canal.

According to an embodiment, additional microphones are optionally arranged on the outside of the headphone, possibly also on the top side at the bracket, for measuring and analyzing the sound situation in the reproduction room.

In embodiments, a sound of natural sources and augmented sources that is identical is realized.

Embodiments realize that measurement of the characteristics of the headphone are not required.

Thus, embodiments provide concepts for measuring the room characteristics of the reproduction room.

Some embodiments provide a start value and (post) optimization of the room adaption. The concepts provided also work if the room acoustics of the reproduction room change, e.g., if the listener moves into another room (or space).

Among other things, embodiments are based on installing different techniques for assisting hearing in technical systems and to combine then such that an improvement of the quality of sound and life (e.g. desired sound is louder, undesired sound is softer, better speech comprehensibility) is achieved for people with normal hearing and for people with hearing loss.

Figure 2:
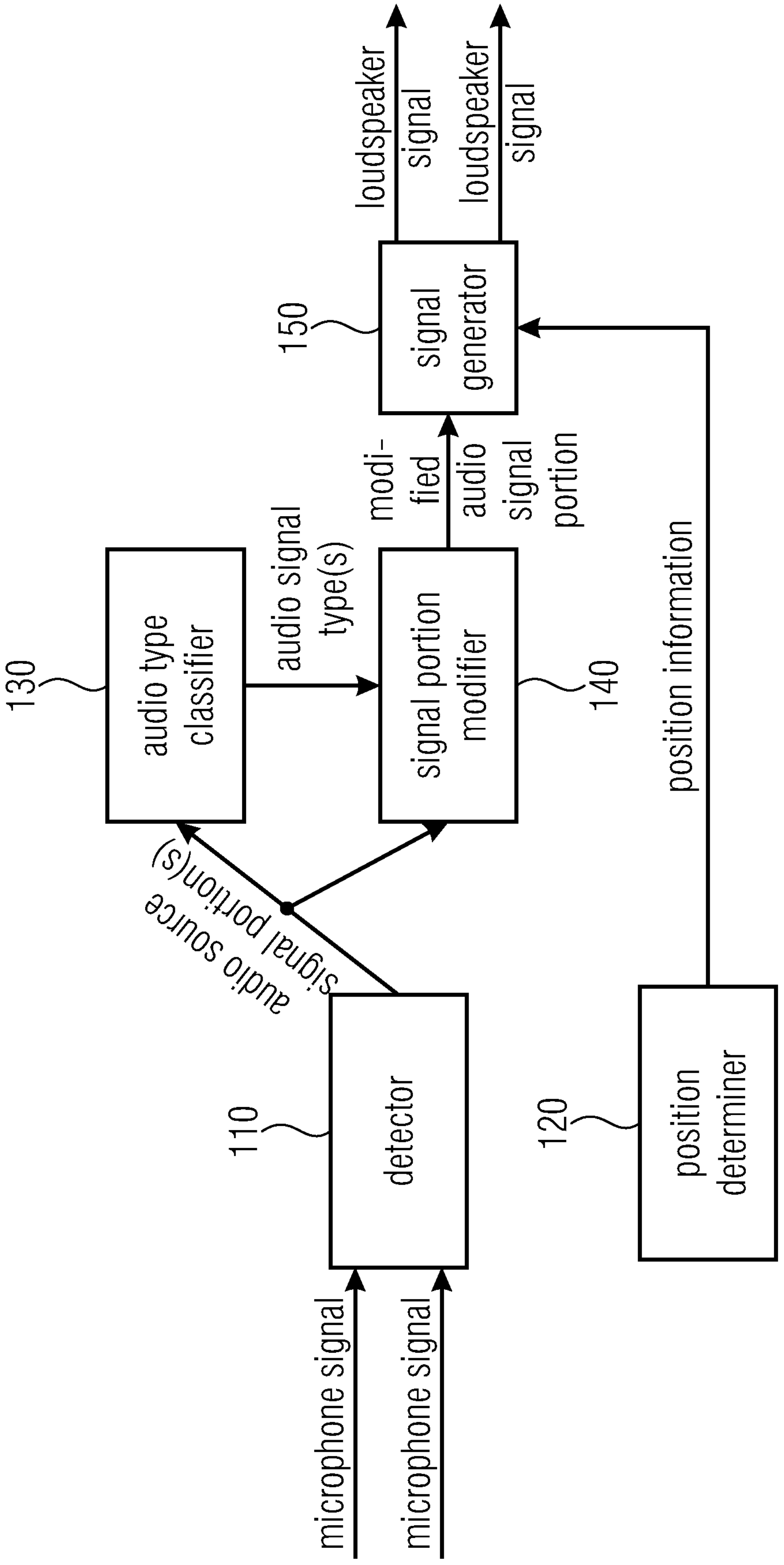
FIG. 2 shows a further system for assisting selective hearing according to a further embodiment.

FIG. 2 shows a system for assisting selective hearing according to an embodiment.

The system includes a detector 110 for detecting an audio source signal portion of one or more audio sources by using at least two received microphone signals of a hearing environment (or listening environment).

In addition, the system includes a position determiner 120 for assigning position information to each of the one or more audio sources.

In addition, the system includes an audio type classifier 130 for allocating an audio signal type to the audio source signal portion of each of the one or more audio sources.

In addition, the system includes a signal portion modifier 140 for varying the audio source signal portion of at least one audio source of the one or more audio sources depending on the audio signal type of the audio source signal portion of the at least one audio source so as to obtain a modified audio signal portion of the at least one audio source.

The analyzer 152 and the loudspeaker signal generator 154 of FIG. 1 together form a signal generator 150.

The analyzer 152 of the signal generator 150 is configured for generating the plurality of binaural room impulse responses, wherein the plurality of binaural room impulse responses is a plurality of binaural room impulse responses for each audio source of the one or more audio sources that depends on the position information of this audio source and an orientation of a user's head.

The loudspeaker signal generator 154 of the signal generator 150 is configured to generate the at least two loudspeaker signals depending on the plurality of the binaural room impulse responses and depending on the modified audio signal portion of the at least one audio source.

According to an embodiment, e.g., the detector 110 may be configured to detect the audio source signal portion of the one or more audio sources by using deep learning models.

In an embodiment, e.g., the position determiner 120 may be configured to determine, for each of the one or more audio sources, the position information depending on a captured image or a recorded video.

According to an embodiment, e.g., the position determiner 120 may be configured to determine, for each of the one or more audio sources, the position information depending on the video by detecting a lip movement of a person in the video and by allocating, depending on the lip movement, the same to the audio source signal portion of one of the one or more audio sources.

In an embodiment, e.g., the detector 110 may be configured to determine one or more acoustical properties of the hearing environment depending on the at least two received microphone signals.

According to an embodiment, e.g., the signal generator 150 may be configured to determine the plurality of binaural room impulse responses depending on the one or more acoustical properties of the hearing environment.

In an embodiment, e.g., the signal portion modifier 140 may be configured to select the at least one audio source whose audio source signal portion is modified depending on a previously learned user scenario and to modify the same depending on the previously learned user scenario.

Figure 3:
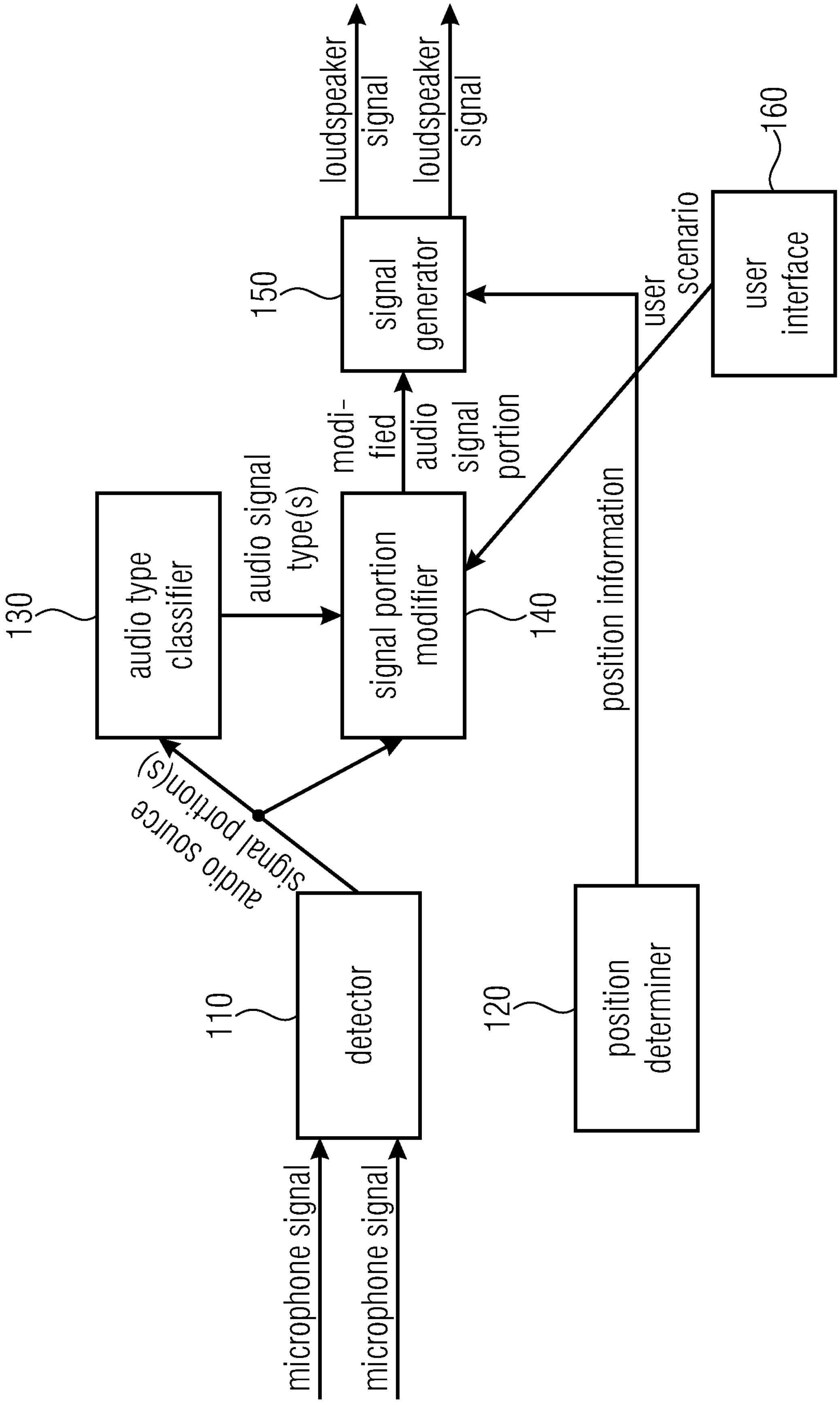
FIG. 3 shows a further system for assisting selective hearing, additionally including a user interface.

According to an embodiment, e.g., the system may include a user interface 160 for selecting the previously learned user scenario from a group of two or more previously learned user scenarios. FIG. 3 shows such a system according to an embodiment, additionally including such a user interface 160.

In an embodiment, e.g., the detector 110 and/or the position determiner 120 and/or the audio type classifier 130 and/or the signal modifier 140 and/or the signal generator 150 may be configured to perform parallel signal processing using a Hough transformation or employing a plurality of VLSI chips or by employing a plurality of memristors.

Figure 4:
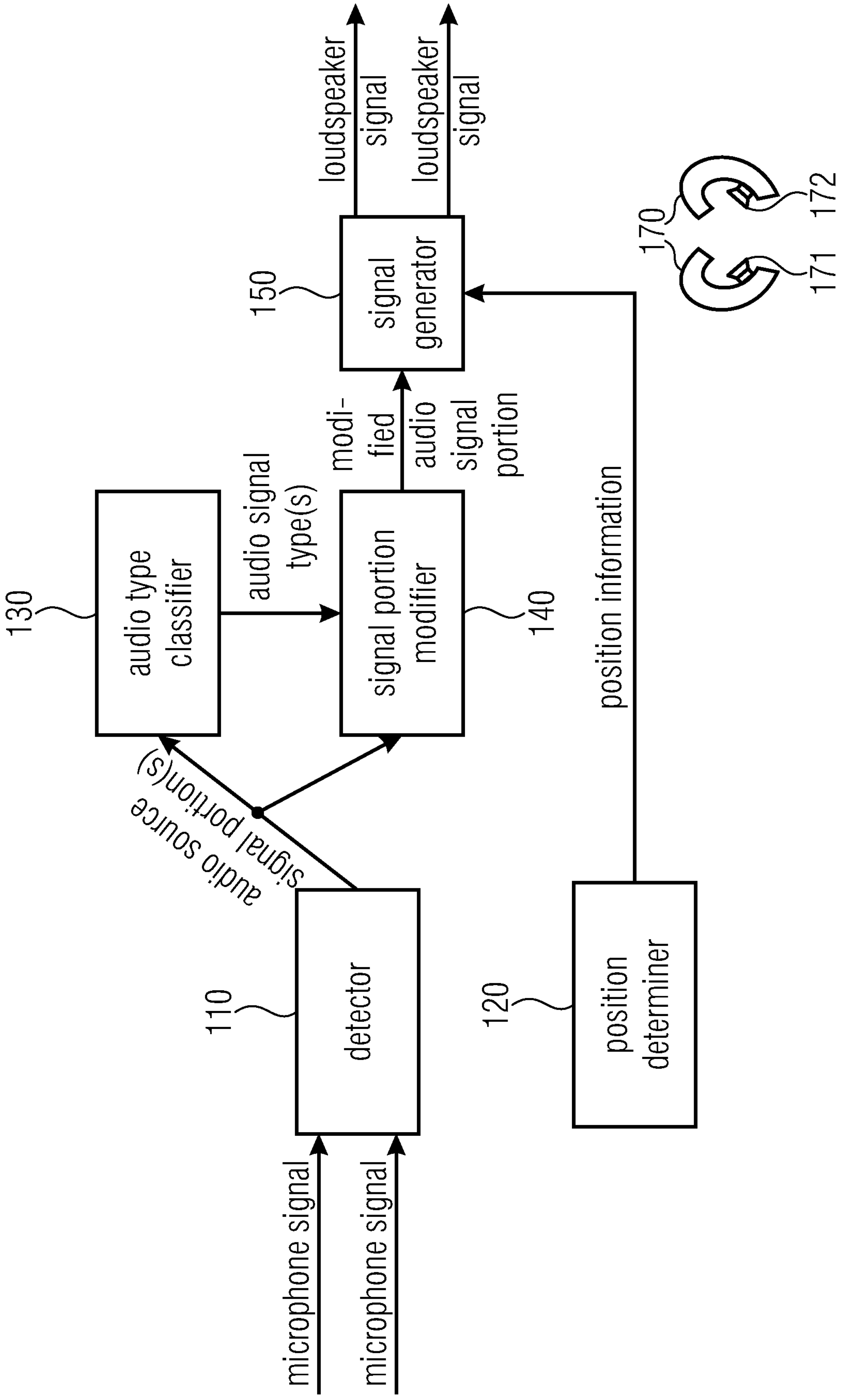
FIG. 4 shows a system for assisting selective hearing, including a hearing device with two corresponding loudspeakers.

According to an embodiment, e.g., the system may include a hearing device 170 that serves as a hearing aid for users that are limited in their hearing capability and/or have damaged hearing, wherein the hearing device includes at least two loudspeakers 171, 172 for outputting the at least two loudspeaker signals. FIG. 4 shows such a system according to an embodiment, including such a hearing device 170 with two corresponding loudspeakers 171, 172.

Figure 5A:
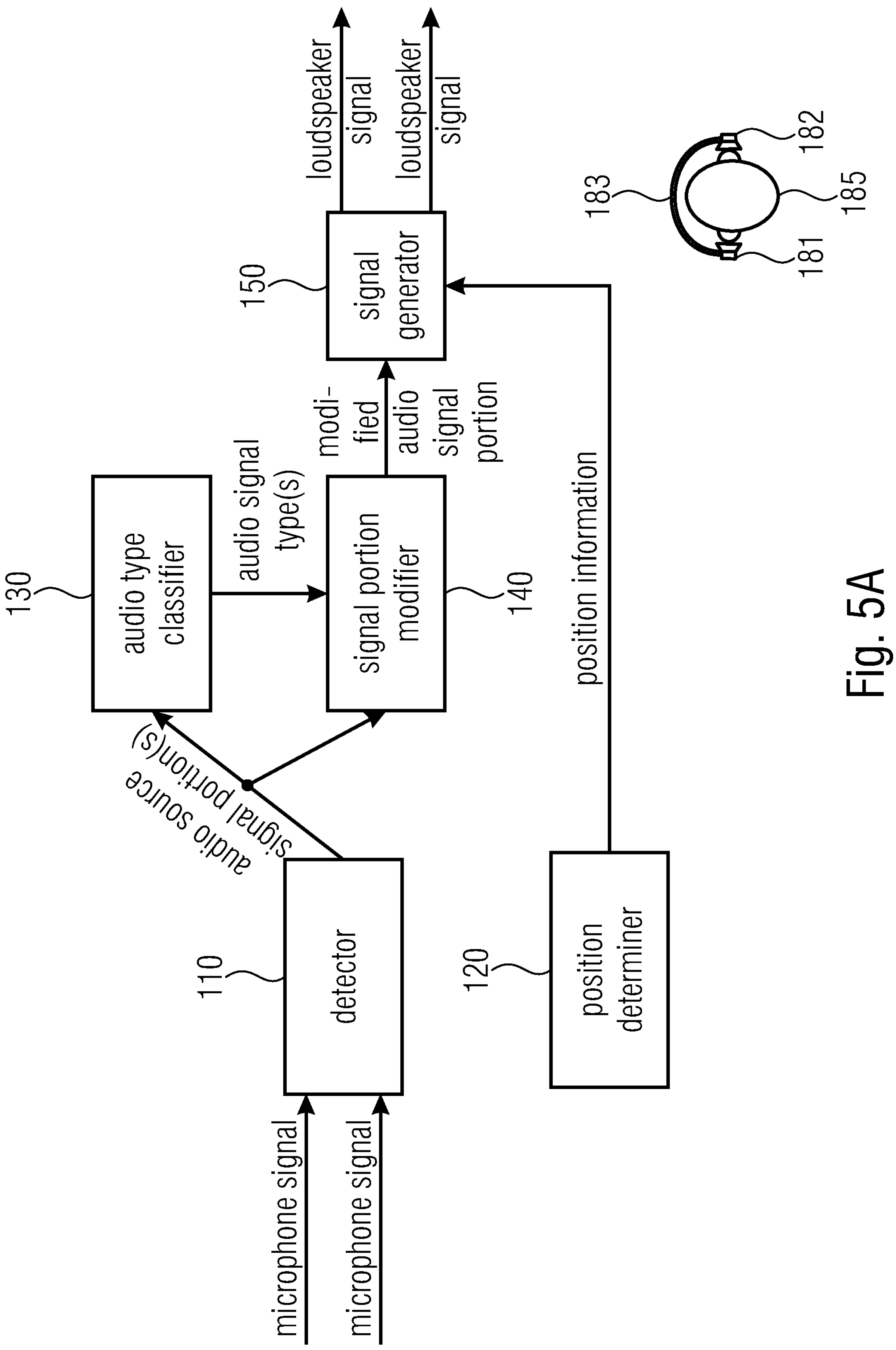
FIG. 5A shows a system for assisting selective hearing, including a housing structure and two loudspeakers.

In an embodiment, e.g., the system may include at least two loudspeakers 181, 182 for outputting the at least two loudspeaker signals, and a housing structure 183 that houses the at least two loudspeakers, wherein the at least one housing structure 183 is suitable for being fixed to a user's head 185 or to any other body part of the user. FIG. 5*a* shows a corresponding system including such a housing structure 183 and two loudspeakers 181, 182.

Figure 5B:
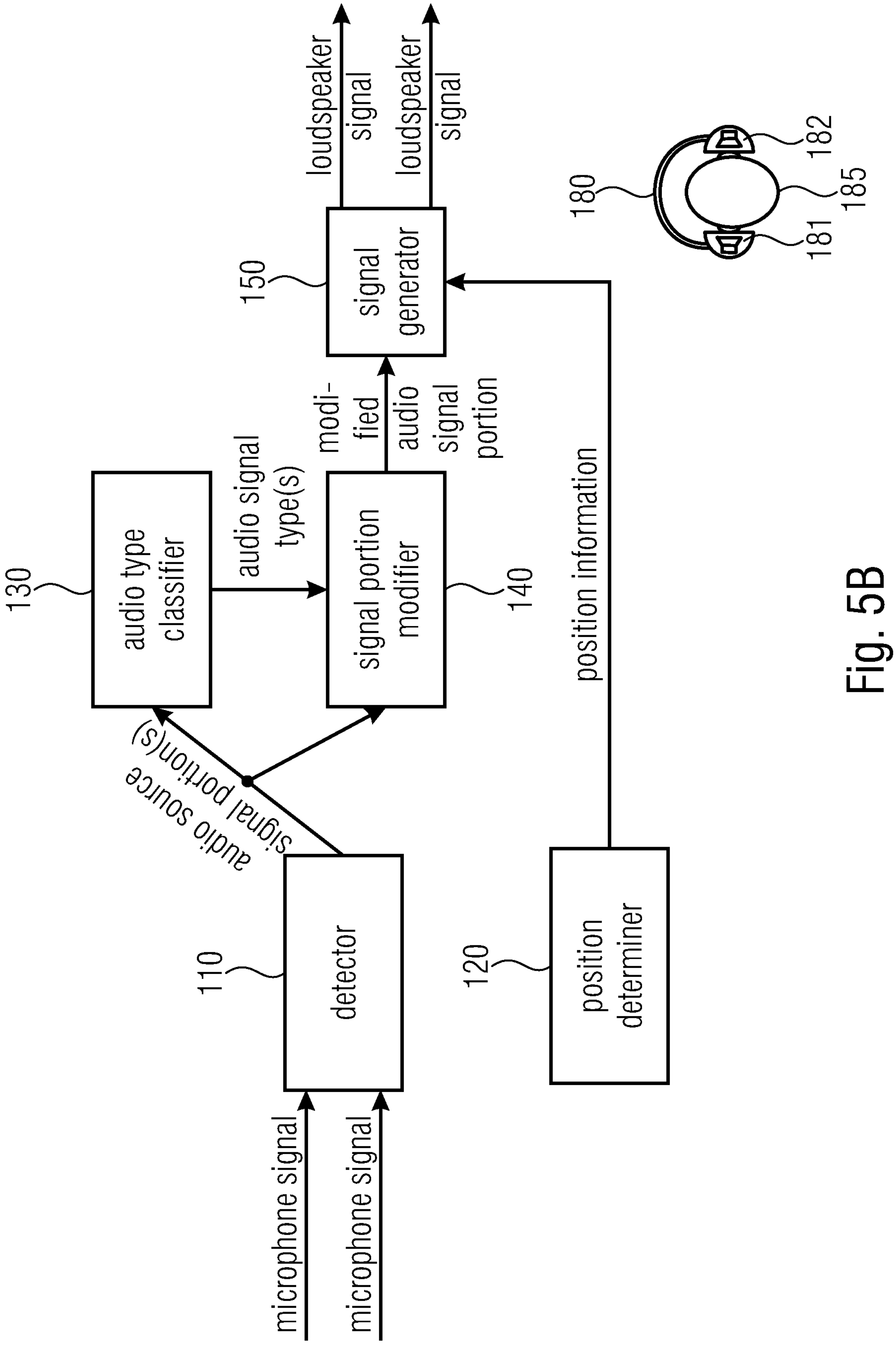
FIG. 5B shows a system for assisting selective hearing, including a headphone with two loudspeakers.

According to an embodiment, e.g., the system may include a headphone 180 that includes at least two loudspeakers 181, 182 for outputting the at least two loudspeaker signals. FIG. 5*b* shows a corresponding headphone 180 with two loudspeakers 181, 182 according to an embodiment.

In an embodiment, e.g., the detector 110 and the position determiner 120 and the audio type classifier 130 and the signal portion modifier 140 and the signal generator 150 may be integrated into the headphone 180.

Figure 6:
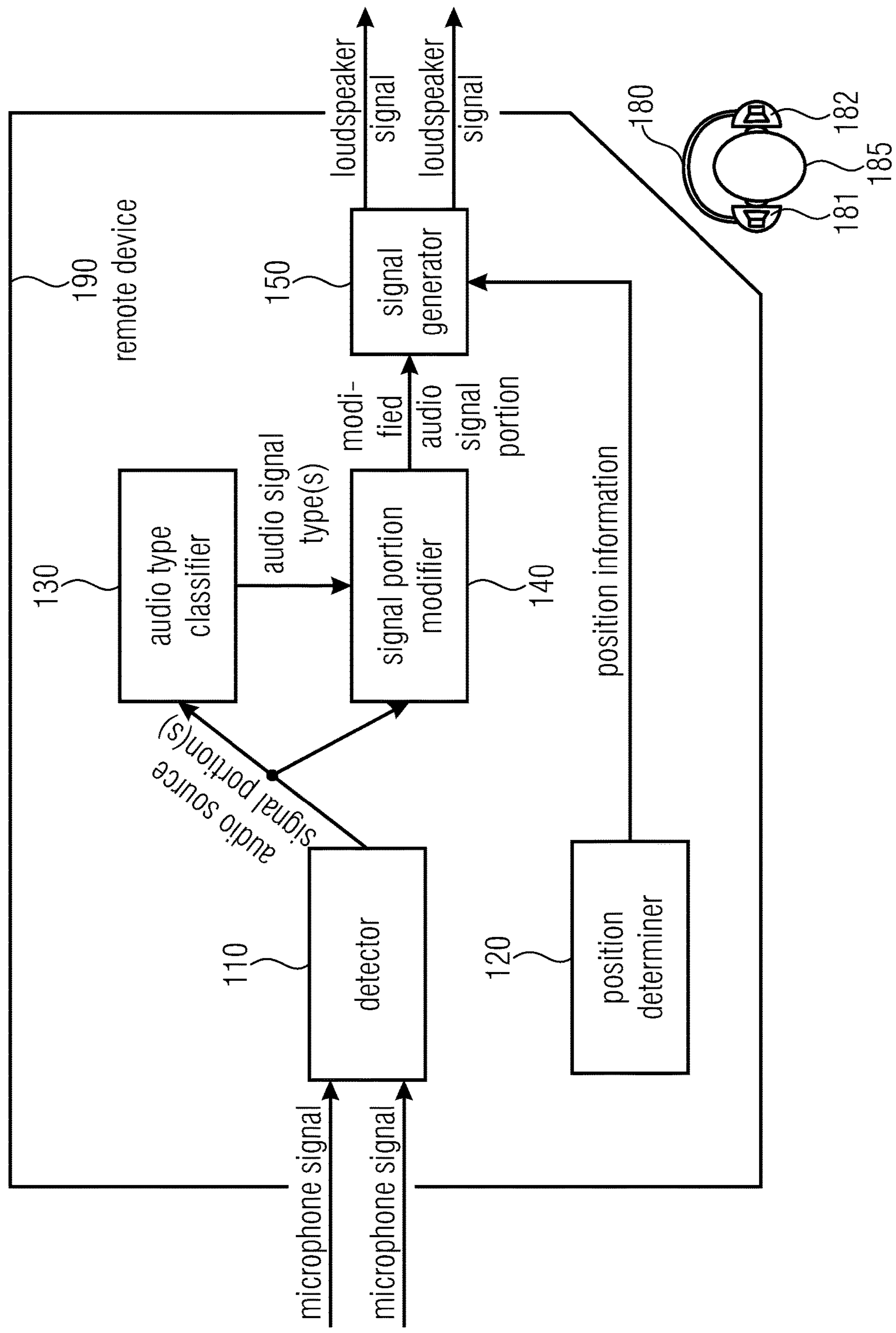
FIG. 6 shows a system according to an embodiment, including a remote device 190 that includes the detector and the position determiner and the audio type classifier and the signal portion modifier and the signal generator.

According to an embodiment, illustrated in FIG. 6, e.g., the system may include a remote device 190 that includes the detector 110 and the position determiner 120 and the audio type classifier 130 and the signal portion modifier 140 and the signal generator 150. In this case, the remote device 190 may be spatially separated from the headphone 180, for example.

In an embodiment, e.g., the remote device 190 may be a Smartphone.

Embodiments do not necessarily use a microprocessor, but use parallel signal processing steps such as a Hough transformation, VLSI chips, or memristors for an energy-efficient realization, also for artificial neural networks, among other things.

In embodiments, the auditory environment is spatially captured and reproduced, which, on the one hand, uses more than one signal for the representation of the input signal and, on the other hand, also uses spatial reproduction.

In embodiments, signal separation is carried out by means of deep learning (DL) models (e.g. CNN, RCNN, LSTM, Siamese network), and simultaneously processes the information from at least two microphone channels, wherein there is at least one microphone in each hearable. According to the invention, several output signals (according to the individual sound sources) are determined together with their respective spatial position through the mutual analysis. If the recording means (microphones) is connected to the head, the positions of the objects vary with movements of the head. This enables natural focusing on important/unimportant sound, e.g. by the turning towards the sound object.

In some embodiments, the algorithms for signal analysis are based on a deep learning architecture for example. Alternatively, this uses variations with an analysis unit or variations with separated networks for the aspects localization, detection, and sound separation. The alternative use of generalized cross-correlation (correlation verses time offset) accommodates the frequency-dependent shadowing/isolation by the head, and improves the localization, detection, and source separation.

According to an embodiment, different source categories (e.g. speech, vehicles, male/female/voice of children, warning tones, etc.) are learned by the detector in a training phase. Here, the source separation networks are also trained as to a high signal quality, as well as the localization networks with targeted stimuli as to a high precision of the localization.

For example, the above-mentioned training steps use multichannel audio data, wherein a first training round is usually carried out in the lab with simulated or recorded audio data. This is followed by a training run in different natural environments (e.g. living room, classroom, train station, (industrial) production environments, etc.), i.e. transfer learning and domain adaption are carried out.

Alternatively or additionally, the position detector could be coupled to one or more cameras so as to determine the visual position of sound sources/audio sources as well. For speech, lip movements and the audio signals coming from the source separator are correlated, achieving a more precise localization.

After the training, there is a DL model with a network architecture and the associated parameters.

In some embodiments, the auralization is carried out by means of binaural synthesis. Binaural synthesis offers the further advantage that it is possible to not fully delete undesired components, but to reduce them to such an extent that they are perceivable but not disturbing. This has the further advantage of perceiving unexpected further sources (warning signals, shouts, . . . ) that would be missed in the case of being fully turned off.

According to some embodiments, the analysis of the auditory environment is not only used for separating the objects, but also for analyzing the acoustical properties (e.g. reverberation time, initial time gap). These properties are then employed in the binaural synthesis so as to adapt the pre-stored (possibly also individualized) binaural room impulse responses (BRIR) to the actual room (or space). By reducing the room divergence, the listener has a significantly reduced listening effort when comprehending the optimized signals. Minimizing the room divergence has effects on the externalization of the hearing events and therefore on the plausibility of the spatial audio reproduction in the monitoring room. For speech comprehension or for general comprehension of optimized signals, there are no known solutions in the conventional technology.

In embodiments, a user interface is used to determine which sound sources are selected. According to the invention, this is done by previously learning different user scenarios such as "amplify speech from straight ahead" (conversation with one person), "amplify speech in the range of +−60 degrees" (conversation in a group), "suppress music and amplify music" (I do not want to hear concert goers), "silence everything" (I want to be left alone), "suppress all shouts and warning tones", etc.

Some embodiments do not depend on the hardware used, i.e., open and closed headphones can be used. The signal processing may be integrated into the headphone, may be in an external device, or may be integrated into a Smartphone. Optionally, in addition to the reproduction of acoustically recorded and processed signals, signals may be reproduced directly from the Smartphone (e.g. music, telephone calls).

In other embodiments, an ecosystem for "selective hearing with AI assistance" is provided. Embodiments refer to the "personalized auditory reality" (PARty). In such a personalized environment, the listener is capable to amplify, reduce, or modify defined acoustical objects. In order to create a sound experience adapted to the individual requirements, a series of analysis and synthesis processes are to be performed. The research work of the targeted conversion phase forms an essential component for this.

Some embodiments realize analysis of the real sound environment and detection of the individual acoustical objects, separation, tracking, and editability of the available objects, and reconstruction and reproduction of the modified acoustical scene.

In embodiments, detection of sound events, separation of the sound events, and suppression of some sound events are realized.

In embodiments, AI methods (in particular deep learning-based methods) are used.

Embodiments of the invention contribute to the technological development for recording, signal processing, and reproduction of spatial audio.

For example, embodiments generate spatiality and three-dimensionality in multimedia systems with interacting users.

In this case, embodiments are based on research knowledge of perceptive and cognitive processes of spatial hearing/listening.

Some embodiments use two or more of the following concepts:

Scene decomposition: This includes a spatial-acoustical detection of the real environment and a parameter estimation and/or a position-dependent sound field analysis.

Scene representation: This includes a representation and identification of the objects and/or the environment and/or an efficient representation and storage.

Scene combination and reproduction: This includes an adaption and variation of the object and the environment and/or rendering and auralization.

Quality evaluation: This includes technical and/or auditory quality measurements.

Microphone positioning: This includes an application of microphone arrays and appropriate audio signal processing.

Signal conditioning: This includes feature extraction as well as data set generation for ML (machine learning).

Estimation of room and ambient acoustics: This includes in-situ measurement and estimation of room acoustics parameters and/or provision of room-acoustical features for source separation and ML.

Auralization: This includes a spatial audio reproduction with auditory adaption to the environment and/or validation and evaluation and/or functional proof and quality estimation.

Figure 8:
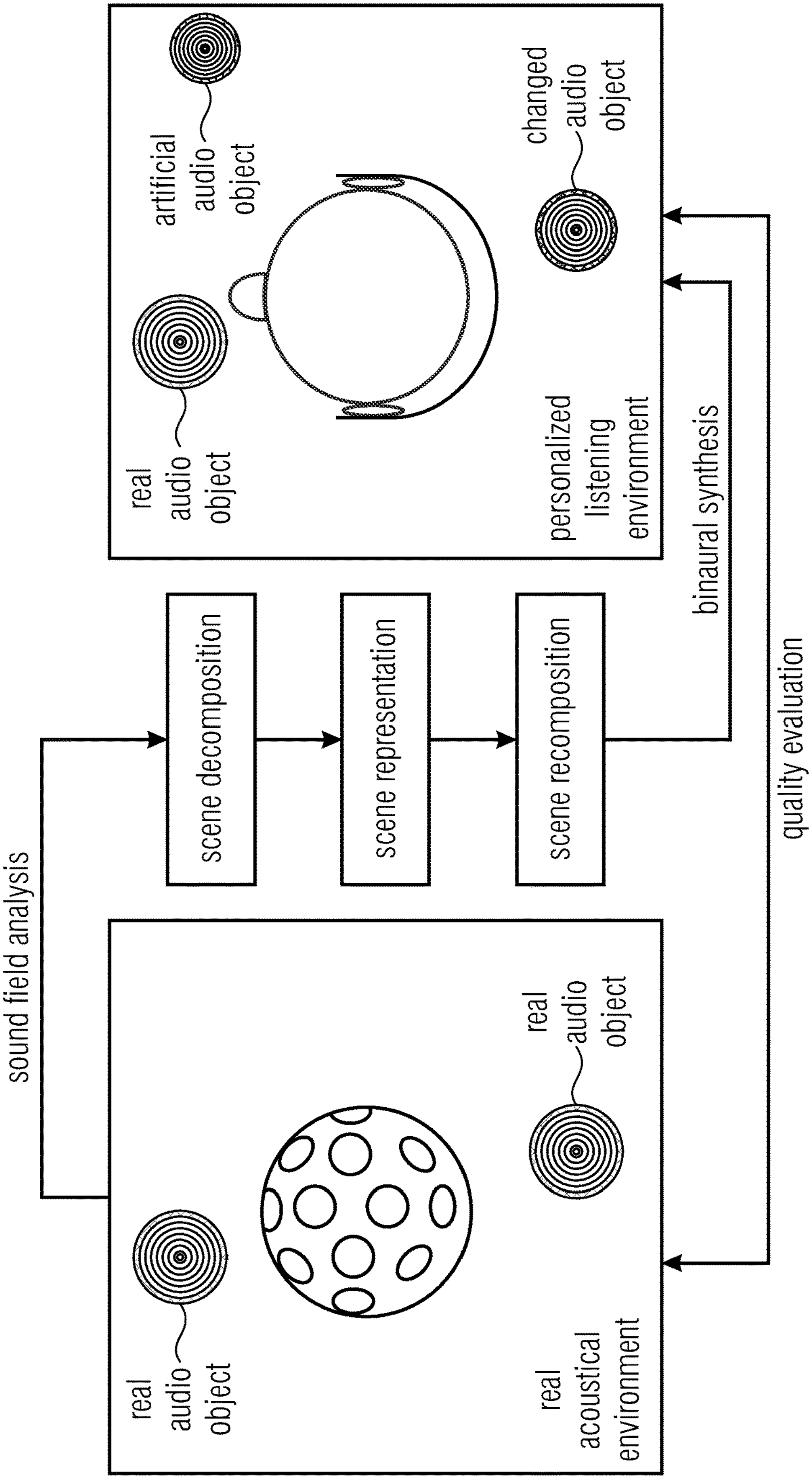
FIG. 8 illustrates a corresponding scenario according to an embodiment.

FIG. 8 illustrates a corresponding scenario according to an embodiment.

Embodiments combine concepts for detection, classification, separation, localization, and enhancement of sound sources, wherein recent advances in each field are highlighted, and connections between them are indicated.

The following provides coherent concepts that are able to combine/detect/classify/locate and separate/enhance sound sources so as to provide the flexibility and robustness needed for SH in real life.

In addition, embodiments provide concepts with a low latency suitable for real-time performance when dealing with the dynamics of auditory scenes in real life.

Some embodiments use concepts for deep learning, machine listening, and smart headphones (smart hearables), enabling listeners to selectively modify their auditory scene.

Embodiments provide a listener with the possibility to selectively enhance, attenuate, suppress, or modify sound sources in the auditory scene by means of a hearing device such as headphones, earphones, etc.

Figure 9:
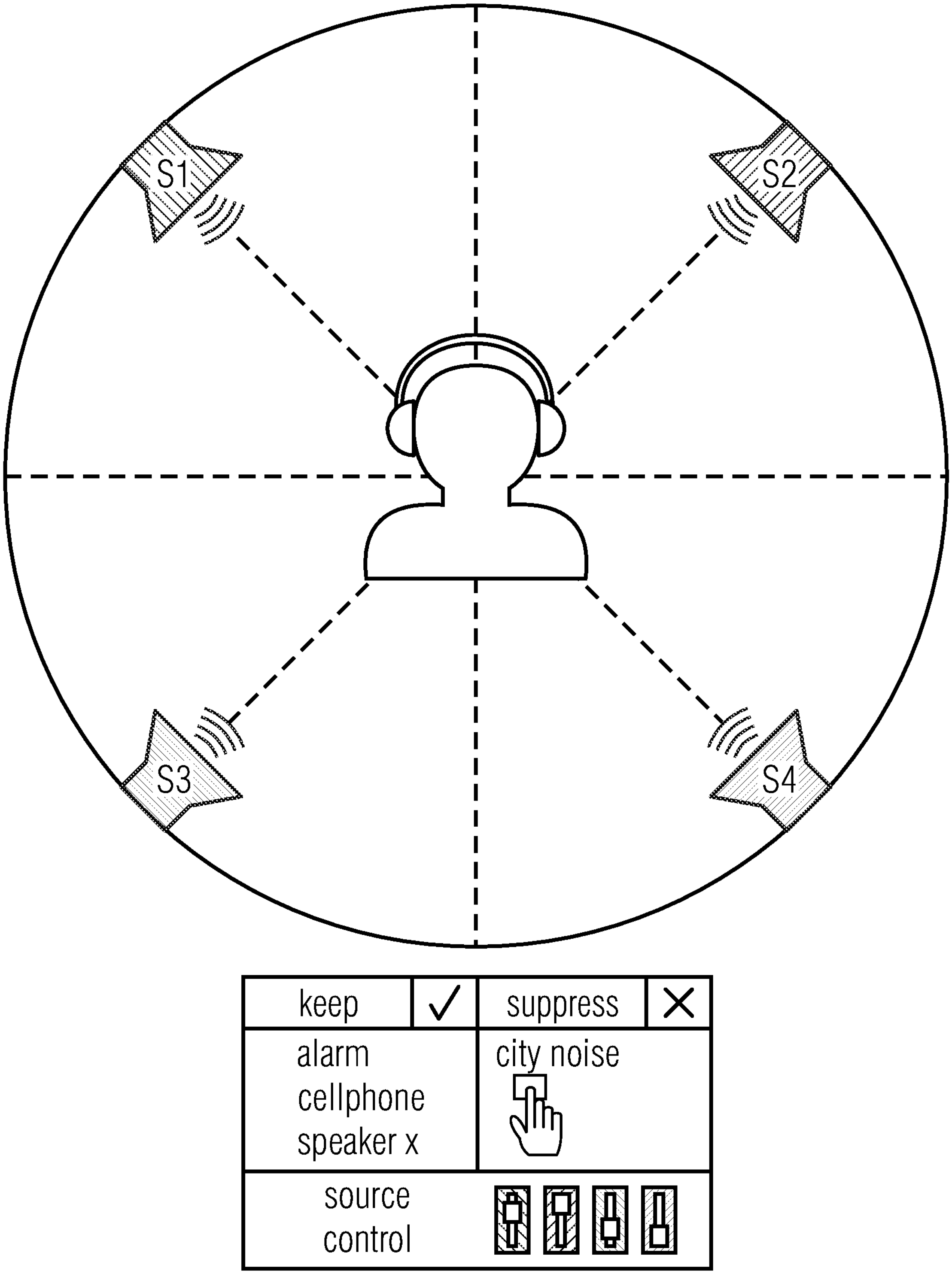
FIG. 9 illustrates a scenario according to an embodiment with four external sound sources.

FIG. 9 illustrates a scenario according to an embodiment with four external sound sources.

In FIG. 9, the user is the center of the auditory scene. In this case, four external sound sources (S1-S4) are active around the user. A user interface enables the listener to influence the auditory scene. The sources S1-S4 may be attenuated, improved, or suppressed with their corresponding sliders. As can be seen in FIG. 2, the listener can define sound sources or sound events that should be retained in or suppressed from the auditory scene. In FIG. 2, the background noise of the city should be suppressed, whereas alarms or telephone ringing should be retained. At all times, the user has the possibility to reproduce (or play) an additional audio stream such as music or radio via the hearing device.

The user is usually the center of the system, and controls the auditory scene by means of a control unit. The user can modify the auditory scene with a user interface as illustrated in FIG. 9 or with any type of interaction such as speech control, gestures, sight direction, etc. Once the user has provided feedback to the system, the next step consists of a detection/classification/localization stage. In some cases, only detection is necessary, e.g. if the user wishes to keep any speech occurring in the auditory scene. In other cases, classification might be necessary, e.g. if the user wishes to keep fire alarms in the auditory scene, but not telephone ringing or office noise. In some cases, only the location of the source is relevant for the system. This is the case, for example, of the four sources in FIG. 9: The user can decide to remove or to attenuate the sound source coming from a certain direction, regardless of the type or the characteristics of the source.

Figure 10:
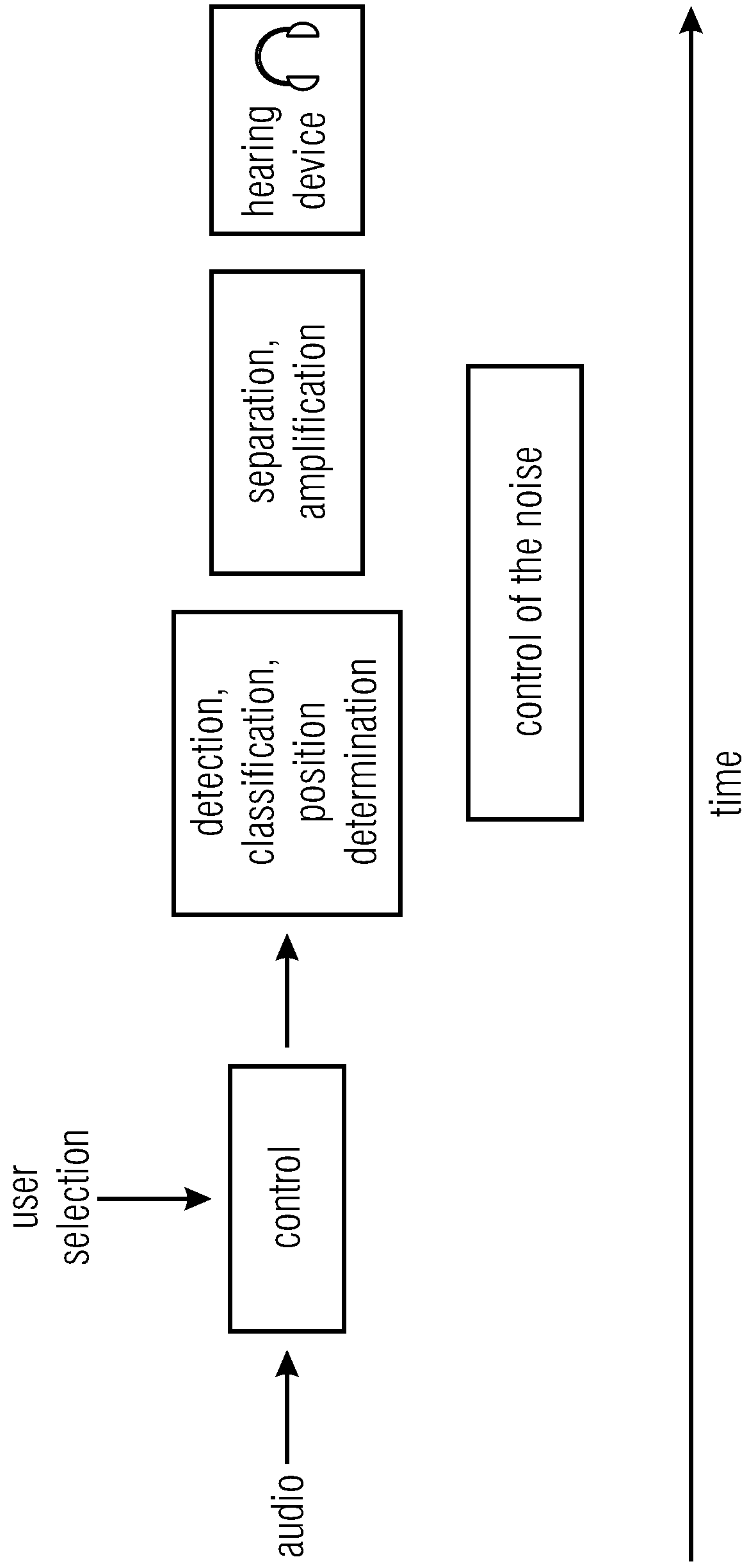
FIG. 10 illustrates a processing workflow of a SH application according to an embodiment.

FIG. 10 shows a processing workflow of a SH application according to an embodiment.

First, the auditory scene is modified in the separation/enhancement stage in FIG. 10. This either takes place either by suppressing, attenuating, or enhancing a certain sound source (e.g. or certain sound sources). As is shown in FIG. 10, an additional processing alternative in SH is noise control, having the goal to remove or to minimize the background noise in the auditory scene. Perhaps the most popular and widespread technology for noise control is active noise control (ANC) [11].

Selective hearing is differentiated from virtual and augmented auditory environments by constraining selective hearing to those applications in which only real audio sources are modified in the auditory scene, without attempting to add any virtual sources to the scene.

From a machine listening perspective, selective hearing applications need technologies to automatically detect, locate, classify, separate, and enhance sound sources. To further clarify the terminology around selective hearing, we define the following terms, highlighting their differences and relationships In embodiments, e.g., sound source localization is used, referring to the ability to detect the position of a sound source in the auditory scene. In the context of audio processing, source location usually refers to the direction of arrival (DOA) of a given source, which can be given either as a 2-D coordinate (azimuth) or as a 3-D coordinate when it includes elevation. Some systems also estimate the distance from the source to the microphone as location information [3]. In the context of music processing, location often refers to the panning of the source in the final mixture, and is usually given as an angle in degrees [4].

According to embodiments, e.g., sound source detection is used, referring to the ability to determine whether any instance of a given sound source type is present in the auditory scene. An example of a detection task is to determine whether any speaker is present in the scene. In this context, determining the number of speakers in the scene or the identity of the speakers is beyond the scope of sound source detection. Detection can be understood as a binary classification task where the classes correspond to “source present” and “source absent.”

In embodiments, e.g., sound source classification is used, allocating a class label from a set of predefined classes to a given sound source or a given sound event. An example of a classification task is to determine whether a given sound source corresponds to speech, music, or environmental noise. Sound source classification and detection are closely related concepts. In some cases, classification systems contain a detection stage by considering “no class” as one of the possible labels. In these cases, the system implicitly learns to detect the presence or absence of a sound source, and is not forced to allocate a class label when there is not enough evidence of any of the sources being active.

According to embodiments, e.g., sound source separation is used, referring to the extraction of a given sound source from an audio mixture or an auditory scene. An example of sound source separation is the extraction of the singing voice from an audio mixture, where besides the singer, other musical instruments are playing simultaneously [5]. Sound source separation becomes relevant in a selective hearing scenario as it allows suppressing sound sources that are of no interest to the listener. Some sound separation systems implicitly perform a detection task before extracting the sound source from the mixture. However, this is not necessarily the rule and hence, we highlight the distinction between these tasks. Additionally, separation often serves as a pre-processing stage for other types of analysis such as source enhancement [6] or classification [7].

In embodiments, e.g., sound source identification is used, which goes a step further and aims to identify specific instances of a sound source in an audio signal. Speaker identification is perhaps the most common use of source identification today. The goal in this task is to identify whether a specific speaker is present in the scene. In the example in FIG. 1, the user has chosen “speaker X” as one of the sources to be retained in the auditory scene. This needs technologies beyond speech detection and classification, and calls for speaker-specific models that allow this precise identification.

According to embodiments, e.g. sound source enhancement is used, refers to the process of increasing the saliency of a given sound source in the auditory scene [8]. In the case of speech signals, the goal is often to increase their perceptual quality and intelligibility. A common scenario for speech enhancement is the de-noising of speech corrupted by noise [9]. In the context of music processing, source enhancement relates to the concept of remixing, and is often performed in order to make one musical instrument (sound source) more salient in the mix. Remixing applications often use sound separation front-ends to gain access to the individual sound sources and change the characteristic of the mixture [10]. Even though source enhancement can be preceded by a sound source separation stage, this is not always the case and hence, we also highlight the distinction between these terms.

In the field of sound source detection, classification, and identification, e.g., some of the embodiments use one of the following concepts, such as the detection and classification of acoustical scenes and events [18]. In this context, methods for audio event detection (AED) in domestic environments have been proposed, where the goal is to detect the time boundaries of a given sound event within 10 seconds recordings [19], [20]. In this particular case, 10 sound event classes were considered, including cat, dog, speech, alarm and running water. Methods for polyphonic sound event (several simultaneous events) detection have also been proposed in the literature [21], [22]. In [21], a method for polyphonic sound event detection is proposed where a total of 61 sound events from real-life contexts are detected using binary activity detectors based on a bi-directional long short-term memory (BLSTM) recurrent neural network (RNN).

Some embodiments, e.g., to deal with weakly labeled data, incorporate temporal attention mechanisms to focus on certain regions of the signal for classification [23]. The problem of noisy labels in classification is particularly relevant for selective hearing applications where the class labels can be so diverse that high-quality annotations are very costly [24]. Noisy labels in sound event classification tasks were addressed in [25], where noise-robust loss functions based on the categorical cross-entropy, as well as ways of evaluating both noisy and manually labeled data are presented. Similarly, [26] presents a system for audio event classification based on a convolutional neural network (CNN) that incorporates a verification step for noisy labels based on prediction consensus of the CNN on multiple segments of the training example.

For example, some embodiments realize a simultaneous detection and localization of sound events. Thus, some embodiments perform detection as a multi-label classification task, such as in [27], and location is given as the 3-D coordinates of the direction of arrival (DOA) for each sound event.

Some embodiments use concepts of the voice activity detection and speaker recognition/identification for SH. Voice activity detection has been addressed in noisy environments using de-noising auto-encoders [28], recurrent neural networks [29], or as an end-to-end system using raw waveforms [30]. For speaker recognition applications, a great number of system have been proposed in the literature [31], the great majority focusing on increasing robustness to different conditions, for example with data augmentation or with improved embedding that facilitates recognition [32]—[34]. Thus, some of the embodiments use these concepts.

Further embodiments use concepts for the classification of musical instruments for the sound event detection. Musical instrument classification in both monophonic and polyphonic settings has been addressed in the literature [35], [36]. In [35], the predominant instruments in 3 sec audio segments are classified between 11 instrument classes, proposing several aggregation techniques. Similarly, [37] proposes a method for musical instrument activity detection that is able to detect instruments in a finer temporal resolution of 1 sec. A significant amount of research has been done in the field of singing voice analysis. In particular, methods such as [38] have been proposed for the task of detecting segments in an audio recording where the singing voice is active. Some of the embodiments use these concepts.

Some of the embodiments use one of the concepts discussed in the following for the sound source localization. Sound source localization is closely related to the problem of source counting, as the number of sound sources in the auditory scene is usually not known in real-life applications. Some systems work under the assumption that the number of sources in the scene is known. That is the case, for example, with the model presented in [39] that uses histograms of active intensity vectors to locate the sources. From a supervised perspective, [40] proposes a CNN-based algorithm to estimate the DOA of multiple speakers in the auditory scene using phase maps as input representations. In contrast, several works in the literature jointly estimate the number of sources in the scene and their location information. This is the case in [41], where a system for multi-speaker localization in noisy and reverberant environments is proposed. The system uses a complex-valued Gaussian Mixture Model (GMM) to estimate both the number of sources and their localization. The concepts described there are used by some of the embodiments.

Sound source localization algorithms can be computationally demanding as they often involve scanning a large space around the auditory scene [42]. In order to reduce computational requirements in localization algorithms, some embodiments use concepts that reduce the search space by using clustering algorithms [43], or by performing multi-resolution searches [42] on well-established methods such as those based on the steered response power phase transform (SRP-PHAT). Other methods impose sparsity constraints and assume only one sound source is predominant in a given time-frequency region [44]. More recently, an end-to-end system for azimuth detection directly from the raw waveforms has been proposed in [45]. Some of the embodiments use these concepts.

Some of the embodiments use subsequently described concepts for sound source separation (SSS), in particular from the fields of the speech separation and music separation.

In particular, some embodiments use concepts of speaker-independent separation. Separation is performed there without any prior information about the speaker in the scene [46]. Some embodiments also evaluate the spatial location of the speaker in order to perform a separation [47].

Given the importance of computational performance in selective hearing applications, research conducted with the specific aim of achieving low-latency is of particular relevance. Some works have been proposed to perform low-latency speech separation (<10 ms) with little training data available [48]. In order to avoid delays caused by framing analysis in the frequency domain, some systems approach the separation problem by carefully designing filters to be applied in the time domain [49]. Other systems achieve low-latency separation by directly modelling the time-domain signal using encoder-decoder framework [50]. In contrast, some systems have attempted to reduce the framing delay in frequency domain separation approaches [51]. These concepts are employed by some of the embodiments.

Some embodiments use concepts for music sound separation (MSS), extracting a music sources from an audio mixture [5], such as concepts for lead instrument-accompaniment separation [52]. These algorithms take the most salient sound source in the mixture, regardless of its class label, and attempt to separate it from the remaining accompaniment. Some embodiments use concepts for singing voice separation [53]. In most cases, either specific source models [54] or data-driven models [55] are used to capture the characteristics of the singing voice. Even though systems such as the one proposed in [55] do not explicitly incorporate a classification or a detection stage to achieve separation, the data-driven nature of these approaches, allows these systems to implicitly learn to detect the singing voice with certain accuracy before separation. Another class of algorithms in the music domain attempt to perform separation using only the location of the sources, without attempting to classify or detect the source before separation [4].

Some of the embodiments use active noise control (ANC) concepts, such as the active noise cancellation (ANC). ANC systems mostly aim at removing background noise for headphone users by introducing an anti-noise signal to cancel it out [11]. ANC can be considered a special case of SH, and faces an equally strict performance requirement [14]. Some works have focused on active noise control in specific environments such as automobile cabins [56] or industrial scenarios [57]. The work in [56] analyses the cancellation of different types of noises such as road noise and engine noise, and calls for unified noise control systems capable of dealing with different types of noises. Some work has focused on developing ANC systems to cancel noise over specific spatial regions. In [58], ANC over a spatial region is addressed using spherical harmonics as base functions to represent the noise field. Some of the embodiments use the concepts described herein.

Some of the embodiments use concepts for sound source enhancement.

In the context of speech enhancement, one of the most common applications is the enhancement of speech that has been corrupted by noise. A great deal of work has focused on phase processing of single-channel speech enhancement [8]. From a deep neural network perspective, the problem of speech de-noising has been addressed with de-noising autoencoders in [59], as a non-linear regression problem between clean and noisy speech using a deep neural network (DNN) in [60], and as an end-to-end system using Generative Adversarial Networks (GANs) in [61]. In many cases, speech enhancement is applied as a front-end for automatic speech recognition (ASR) systems, as is the case of [62], where speech enhancement is approached with an LSTM RNN. Speech enhancement is also often done in conjunction with sound source separation approaches where the idea is to first extract the speech, to then apply enhancement techniques on the isolated speech signal [6]. The concepts described herein are used by some of the embodiments.

In most cases, source enhancement in connection with music refers to applications for creating music remixes. In contrast to speech enhancement where often the assumption is that the speech is only corrupted by noise sources, music applications mostly assume that other sound sources (music instruments) are simultaneously playing with the source to be enhanced. For this reason, music remix applications are provided such that they are preceded by a source separation stage. In [10] for example, early jazz recordings were remixed by applying lead-accompaniment and harmonic-percussive separation techniques in order to achieve better sound balance in the mixture. Similarly, [63] studied the use of different singing voice separation algorithms in order to change the relative loudness of the singing voice and the backing track, showing that a 6 dB increase is possible by introducing minor but audible distortions into the final mixture. In [64], the authors study ways of enhancing music perception for cochlear implant users by applying sound source separation techniques to achieve new mixes. The concepts described there are used by some of the embodiments.

One of the biggest challenges in selective hearing applications relates to the strict requirements with respect to processing time. The full processing workflow needs to be carried out with minimal delay in order to maintain the naturalness and perceptual quality for the user. The maximum acceptable latency of a system highly depends on the application and on the complexity of the auditory scene. For example, McPherson et al. propose 10 ms as an acceptable latency reference for interactive music interfaces [12]. For music performances over a network, the authors in [13] report that delays become perceivable in the range between 20-25 ms and 50-60 ms. However, active noise control/cancellation (ANC) technologies call for ultra-low latency processing for better performance. In these systems, the amount of acceptable latency is both frequency- and attenuation-dependent, but can be as low as 1 ms for an approximately 5 dB attenuation of frequencies below 200 Hz [14]. A final consideration in SH applications refers to the perceptual quality of the modified auditory scene. Considerable amount of work has been devoted to methodologies for reliable assessment of audio quality in different applications [15], [16], [17]. However, the challenge for SH is managing the clear trade-off between processing complexity and perceptual quality. Some of the embodiments use the concepts described therein.

Some embodiments use concepts for counting/computing and localization, as described in [41], for localization and detection, as described in [27], for separation and classification, as described in [65], and for separation and counting, as described in [66].

Some embodiments use concepts for enhancing the robustness of current machine listening methods, as described in [25], [26], [32], [34], where new emerging directions include domain adaption [67] and training on data sets recorded with multiple devices [68].

Some of the embodiments use concepts for increasing the computational efficiency of machine listening methods, as described in [48], or concepts described in [30], [45], [50], [61], capable of dealing with raw waveforms.

Some embodiments realize a unified optimization scheme that detects/classifies/locates and separates/enhances in a combined way in order to be able to selectively modify sound sources in the scene, wherein independent detection, separation, localization, classification, and enhancement methods are reliable and provide the robustness and flexibility needed for SH.

Some embodiments are suited for real-time processing, wherein there is a good trade-off between algorithmic complexity and performance.

Some embodiments combine ANC and machine listening. For example, the auditory scene is first classified and ANC is then applied selectively.

Further embodiments are provided in the following.

In order to augment a real hearing environment with virtual audio objects, the transfer functions from each of the positions of the audio objects to each of the position of the listeners in a room have to be known sufficiently.

The transfer functions maps the properties of the sound sources, and the direct sound between the objects and the user, and all reflections occurring in the room. In order to ensure correct spatial audio reproduction for the room acoustics of a real room the listener is currently in, the transfer functions additionally have to map the room-acoustical properties of the listener room with sufficient precision.

In audio systems suited for the representation of individual audio objects at different positions in the room, the challenge, upon presence of a large number of audio objects, is the appropriate detection and separation of the individual audio objects. In addition, the audio signals of the objects overlap in the recording position or in the listening position of the room. The room acoustics and the overlap of the audio signals change when the objects and/or the listening position in the room changes.

With relative movement, estimation of room acoustics parameters has to be performed sufficiently fast. Here, low latency of the estimation is more important than high precision. If the position of the source and the receiver does not change (static case), high precision is needed. In the proposed system, room acoustics parameters, as well as the room geometry and the listener position are estimated, or extracted, from a stream of audio signals. The audio signals are recorded in a real environment in which the source(s) and the receiver(s) are able to move in any directions, and in which the source(s) and/or the receiver(s) are able to arbitrarily change their orientation.

The audio signal stream may be the result of any microphone setup that includes one or multiple microphones. The streams are fed into a signal processing stage for pre-processing and/or further analysis. Then, the output is fed into a feature extraction stage. This stage estimates the room acoustics parameters, e.g. T60 (reverberation time), DRR (Direct-to-Reverberant Ratio), and others.

A second data stream is generated by a 6 DoF sensor ("six degrees of freedom": three dimensions each for positions in the room and viewing direction) that captures the orientation and position of the microphone setup. The position data stream is fed into a 6 DoF signal processing stage for pre-processing or further analysis.

The output of the 6 DoF signal processing, the audio feature extraction stage, and the pre-processed microphone streams is fed into a machine learning block in which the auditory space, or listening room, (size, geometry, reflecting surfaces) and the position of the microphone field in the room are estimated. In addition, a user behavior model is applied in order to enable a more robust estimation. This model considers limitations of human movements (e.g. continuous movement, speed, etc.), as well as the probability distribution of different types of movements.

Some of the embodiments realize blind estimation of room acoustics parameters by using any microphone arrangements and by adding position and posture information of the user, as well as by analysis of the data with machine learning methods.

For example, systems according to embodiments may be used for acoustically augmented reality (AAR). In this case, a virtual room impulse response has to be synthesized from the estimated parameters.

Some embodiments contain the removal of the reverberation from the recorded signals. Examples for such embodiments are hearing aids for people of normal hearing and for people of impaired hearing. In this case, the reverberation may be removed from the input signal of the microphone setup with the help of the estimated parameters.

A further application is the spatial synthesis of audio scenes generated in a room other than the current auditory space. To this end, the room acoustics parameters that are part of the audio scenes are adapted with respect to the room acoustics parameters of the auditory space.

In case of a binaural synthesis, to this end, the available BRIRs are adapted to the different acoustics parameters of the auditory space.

In an embodiment, an apparatus for determining one or more room acoustics parameters is provided.

The apparatus is configured to obtain microphone data including one or more microphone signals.

In addition, the apparatus is configured to obtain tracking data concerning a position and/or orientation of a user.

In addition, the apparatus is configured to determine the one or more room acoustics parameters depending on the microphone data and depending on the tracking data.

According to an embodiment, e.g., the apparatus may be configured to employ machine learning to determine the one or more room acoustics parameters depending on the microphone data and depending on the tracking data.

In embodiments, e.g., the apparatus may be configured to employ machine learning in that the apparatus may be configured to employ a neural network.

According to an embodiment, e.g., the apparatus may be configured to employ cloud-based processing for machine learning.

In an embodiment, e.g., the one or more room acoustics parameters may include a reverberation time.

According to an embodiment, e.g., the one or more room acoustics parameters may include a direct-to-reverberant ratio.

In an embodiment, e.g., the tracking data may include an x-coordinate, a y-coordinate, and a z-coordinate to label the position of the user.

According to embodiments, e.g., the tracking data may include a pitch coordinate, a yaw coordinate, and a roll coordinate to label the orientation of the user.

In embodiments, e.g., the apparatus may be configured to transform the one or more microphone signals from a time domain into a frequency domain, e.g., wherein the apparatus may be configured to extract one or more features of the one or more microphone signals in the frequency domain, e.g., and wherein the apparatus may be configured to determine the one or more room acoustics parameters depending on the one or more features.

According to an embodiment, e.g., the apparatus may be configured to employ cloud-based processing for extracting the one or more features.

In an embodiment, e.g., the apparatus may include a microphone arrangement of several microphones to record the several microphone signals.

According to an embodiment, e.g., the microphone arrangement may be configured to be worn at a user's body.

In embodiments, e.g., the above-described system may further include an above-described apparatus for determining one or more room acoustics parameters.

According to an embodiment, e.g., the signal portion modifier 140 may be configured to perform the variation of the audio source signal portion of the at least one audio source of the one or more audio sources depending on at least one of the one or more room acoustics parameters; and/or wherein the signal generator 150 may be configured to perform the generation of at least one of the plurality of binaural room impulse responses for each audio source of the one or more audio source depending on the at least one of the one or more room acoustics parameters.

Figure 7:
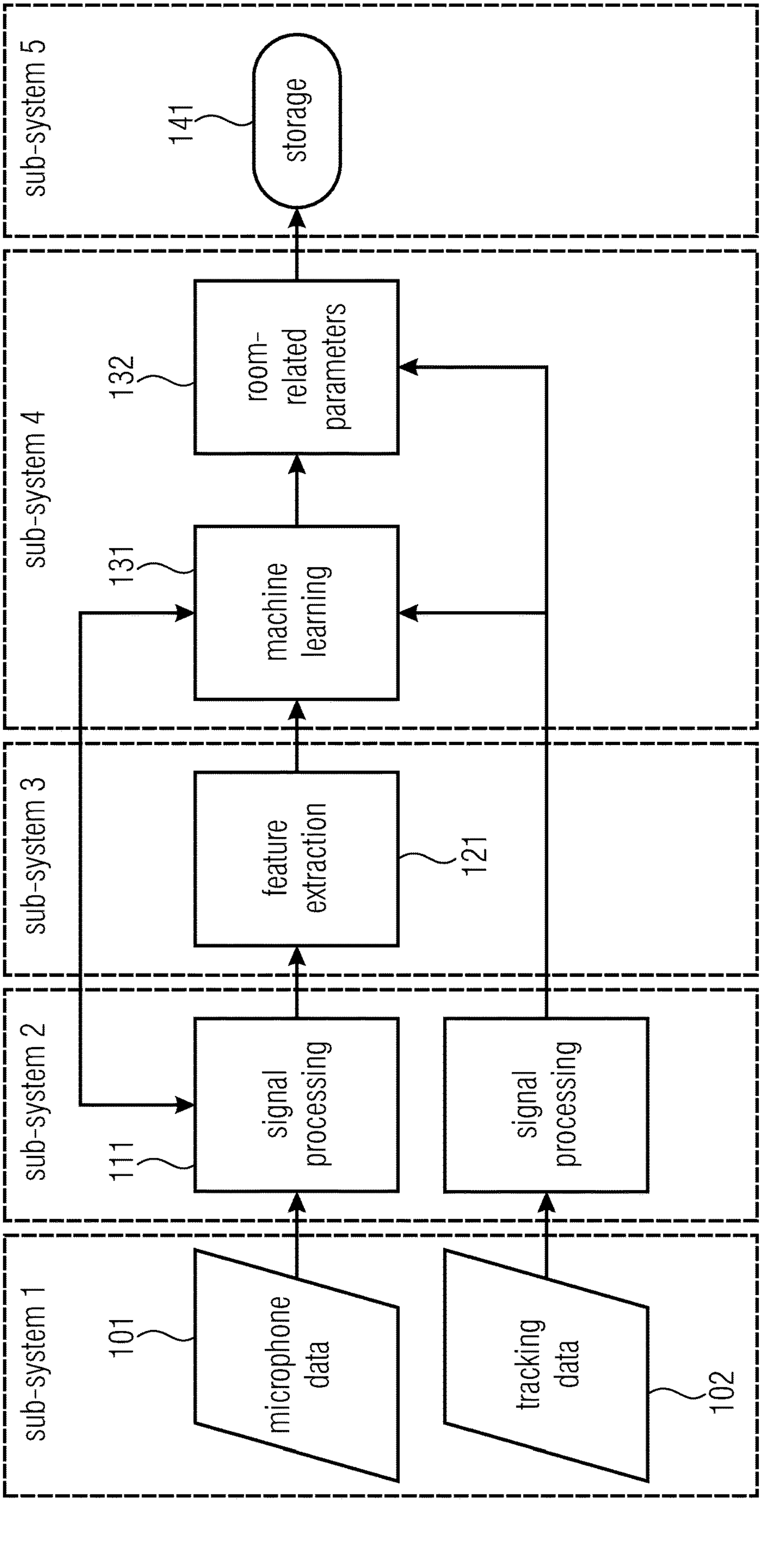
FIG. 7 shows a system according to an embodiment, including five subsystems.

FIG. 7 shows a system according to an embodiment, including five subsystems (subsystem 1-5).

Subsystem 1 includes a microphone setup of one, two, or more individual microphones that may be combined into a microphone field if more than one microphone is available. Positioning and relative arrangement of the microphone/the microphones with respect to each other may be arbitrary. The microphone arrangement may be part of a device worn by the user, or it may be a separate device positioned in the room of interest.

In addition, subsystem 1 includes a tracking device to measure translational positions of the user and the head posture of the user in the room. Up to 6 DoF (x-coordinate, y-coordinate, z-coordinate, pitch angle, yaw angle, roll angle) may be measured.

The tracking device may be positioned at the head of a user, or it may be divided into several sub-devices to measure the needed DoFs, and it may be placed on the user or not on the user.

Thus, subsystem 1 represents an input interface that includes a microphone signal input interface 101 and a position information input interface 102.

Subsystem 2 includes signal processing for the recorded microphone signal(s). This includes frequency transformation and/or time domain-based processing. In addition, this includes methods for combining different microphone signals to realize field processing. Feedback from system 4 is possible so as to adapt parameters of the signal processing in subsystem 2. The signal processing block of the microphone signal(s) signals may be part of the device the microphone(s) is/are built into, or it may be part of a separate device. It may also be part of a cloud-based processing.

In addition, subsystem 2 includes signal processing for the recorded tracking data. This includes frequency transformations and/or time-domain based processing. In addition, it includes methods to enhance the technical quality of the signals by employing noise suppression, smoothing, interpolation, and extrapolation. In addition, it includes methods for deriving information of higher levels. This includes velocities, accelerations, path directions, idle times, movement ranges, and movement paths. In addition, this includes prediction of a movement path of the near future, and a speed of the near future. The signal processing block of the tracking signals may be part of the tracking device, or it may be part of a separate device. It may also be a part of a cloud-based processing.

Subsystem 3 includes the extraction of features of the processed microphone(s).

The feature extraction block may be part of the wearable device of the user, or it may be part of a separate device. It may also be part of a cloud-based processing.

Subsystems 2 and 3 realize with their modules 111 and 121 together the detector 110, the audio type classifier 130, and the signal portion modifier 140, for example. For example, subsystem 3, module 121 may output the result of an audio classification to subsystem 2, module 111 (feedback). For example, subsystem 2, module 112 realizes a position determiner 120. Furthermore, in an embodiment, the subsystems 2 and 3 may also realize the signal generator 150, e.g., by subsystem 2, module 111 generating the binaural room impulse responses and the loudspeaker signals.

Subsystem 4 includes methods and algorithms got estimating room acoustics parameters by using the processed microphone signal(s), the extracted features of the microphone signal(s), and the processed tracking data. The output of this block is the room acoustics parameters as idle data, and a control and variation of the parameters of the microphone signal processing in subsystem 2. The machine learning block 131 may be part of the device of the user, or it may be part of a separate device. It may also be part of a cloud-based processing.

In addition, subsystem 4 includes post-processing of the room acoustics idle data parameters (e.g. in block 132). This includes detection of outliers, combination of individual parameters to a new parameter, smoothing, extrapolation, interpolation, and plausibility verification. This block also obtains information from subsystem 2. This includes positions of the near future of the user in the room in order to estimate acoustical parameters of the near future. This block may be part of the device of the user, or it may be part of a separate device. It may also be part of a cloud-based processing.

Subsystem 5 includes storage and allocation of the room acoustics parameters for downstream systems (e.g. in the memory 141). The allocation of the parameters may be realized just-in-time, and/or the time response may be stored. The storage may be performed in the device located on the user or near the user, or it may be performed in a cloud-based system.

Use cases for embodiments of the invention are described in the following.

A use case of an embodiment is home entertainment, and concerns a user in a domestic environment. For example, a user wishes to concentrate on certain reproduction devices such as TV, radio, PC, tablet, and wishes to suppress other sources of disturbance (devices of other users, or children, construction noise, street noise). In this case, the user is located near the preferred reproduction device and selects the device, or its position. Regardless of the user's position, the selected device, or the sound source positions, is acoustically emphasized until the user cancels his/her selection.

For example, the user moves near the target sound source. The user selects the target sound source via an appropriate interface, and the hearable accordingly adapts the audio reproduction on the basis of the user position, the user viewing direction, and the target sound source so as to be able to well understand the target sound source even in the case of disturbing noise.

Alternatively, the user moves near a particularly disturbing sound source. User selects this disturbing sound source via an appropriate interface, and the hearable (hearing device) accordingly adapts the audio reproduction on the basis of the user position, the user viewing direction, and the disturbing sound source so as to explicitly tune out the disturbing sound source.

A further use case of a further embodiment is a cocktail party where a user is located between several speakers.

In the presence of many speakers, e.g., a user wishes to concentrate on one (or more) of them and wishes to tune out, or attenuate, other sources of disturbance. In this use case, the control of the hearable should only need little interaction from the user. Control of the intensity of the selectivity on the basis of bio-signals or detectable indications for difficulties in conversation (frequent questions, foreign languages, strong dialects) would be optional.

For example, the speakers are randomly distributed and move relatively to the listener. In addition, there are periodic pauses of speech, new speakers are added, or other speakers leave the scene. Possibly, sounds of disturbance, such as music, are comparably loud. The selected speaker is acoustically emphasized and is recognized again after speech pauses, changes of his/her position or posture.

For example, a hearable recognizes a speaker in the vicinity of the user. Through an appropriate control possibility (e.g. viewing direction, attention control), the user may select preferred speakers. The hearable adapts the audio reproduction according to the user's viewing direction and the selected target sound source so as to be able to well understand the target sound source even in the case of disturbing noise.

Alternatively, if the user is directly addressed to by a (previously) non-preferred speaker, he/she has to be at least audible in order to ensure natural communication.

Another use case of another embodiment is in a motor vehicle, where a user is located in his/her (or in a) motor vehicle. During the drive, the user wishes to actively direct his/her acoustical attention onto certain reproduction devices, such as navigation devices, radio, or conversation partners so as to be able to better understand them next to the disturbing noise (wind, motor, passenger).

For example, the user and the target sound sources are located at fixed positions within the motor vehicle. The user is static with respect to the reference system, however, the vehicle itself is moving. This needs an adapted tracking solution. The selected sound source position is acoustically emphasized until the user cancels the selection or until warning signals discontinue the function of the device.

For example, a user gets into the motor vehicle, and the surroundings are detected by the device. Through an appropriate control possibility (e.g. speed recognition), the user can switch between the target sound sources, and the hearable adapts the audio reproduction according to the user's viewing direction and the selected target sound source so as to be able to well understand the target sound source even in the case of disturbing noise.

Alternatively, e.g., traffic-relevant warning signals interrupt the normal flow and cancel the selection of the user. A restart of the normal flow is then carried out.

Another use case of a further embodiment is live music and concerns a guest at live music event. For example, the guest at a concert or a live music performance wishes to increase the focus onto the performance with the help of the hearable and wishes to tune out other guests that act disturbingly. In addition, the audio signal itself can be optimized, e.g., in order to balance out unfavorable listening positions or room acoustics.

For example, the user is located between many sources of disturbance; however, the performances are relatively loud in most cases. The target sound sources are located at fixed positions or at least in a defined area, however, the user may be very mobile (e.g. the user may be dancing). The selected sound source positions are acoustically emphasized until the user cancels the selection or until warning signals discontinue the function of the device.

For example, the user selects the stage area or the musician(s) as the target sound source(s). Through an appropriate control possibility, the user may define the position of the stage/the musicians, and the hearable adapts the audio reproduction according to the user's viewing direction and the selected target sound source so as to be able to well understand the target sound source even in the case of disturbing noise.

Alternatively, e.g., warning information (e.g. evacuation, upcoming thunderstorm in the case of open-air events) and warning signals may interrupt the normal flow and cancel the selection of the user. Afterwards, there is a restart of the normal flow.

A further use case of another embodiment is major events, and concern guests at major events. Thus, in major events (e.g. football stadium, ice hockey stadium, large concert hall, etc.), a hearable can be used to emphasize the voice of family members and friends that would otherwise be drowned out in the noise of the crowd.

For example, a major event with many attendees takes place in a stadium or a large concert hall. A group (family, friends, school class) attends the event and is located outside of or in the event location where a large crowd walks around. One or more children lose eye contact to the group and, despite the high noise level due to the noise, call for the group. Then, the user turns off the voice recognition, and the hearable no longer amplifies the voice(s).

For example, a person of the group selects the voice of the missing child at the hearable. The hearable locates the voice. Then, the hearable amplifies the voice and the user may recover the missing child (more quickly) on the basis of the amplified voice.

Alternatively, e.g., the missing child also wears a hearable and selects the voice of his/her parents. The hearable amplifies the voice(s) of the parents. Through the amplification, the child may then locate his/her parents. Thus, the child can walk back to his/her parent. Alternatively, e.g., the missing child also wears a hearable and selects the voice of his/her parents. The hearable locates the voice(s) of the parents and the hearable announces the distance to the voices. In this way, the child may find his/her parents more easily. Optionally, a reproduction of an artificial voice from the hearable may be provided for the announcement of the distance.

For example, coupling of the hearable for a selective amplification of the voice(s) is provided, and voice profiles are stored.

A further use case of a further embodiment is recreational sports and concerns recreational athletes. Listening to music during sports is popular; however, it also entails dangers.

Warning signals or other road users might not be heard. Beside to the reproduction of music, the hearable can react to warning signals or shouts and temporarily interrupt the music reproduction. In this context, a further use case is sports in small groups. The hearables of the sports group could be connected to ensure good communication during sports while suppressing other disturbing noise.

For example, the user is mobile, and possible warnings signals are overlapped by many sources of disturbance. It is problematic that not all of the warning signals potentially concern the user (remote sirens in the city, honking on the streets). Thus, the hearable automatically stops the music reproduction and acoustically emphasizes the warning signals of the communication partner until the user cancels the selection. Subsequently, the music is reproduced normally.

For example, a user is engaged in sports and listens to music via a hearable. Warning signals or shouts concerning the user are automatically detected and the hearable interrupts the reproduction of music. The hearable adapts the audio reproduction to be able to well understand the target sound source/the acoustical environment. The hearable then automatically continues with the reproduction of music (e.g. after the end of the warning signal), or according to a request by the user.

Alternatively, e.g., athletes of a group may connect their hearables. Speech comprehensibility between the group members is optimized and other disturbing noise is suppressed.

Another use case of another embodiment is the suppression of snoring and concerns all people wishing to sleep that are disturbed by snoring. People whose partner snores are disturbed in their nightly rest and have problems sleeping. The hearable provides relief, since it suppresses snoring sounds, ensures nightly rest, and provides domestic peace. At the same time, the hearable lets other sounds pass (a baby crying, alarms sounds, etc.) so that the user is not fully isolated acoustically from the outside world. For example, snoring detection is provided.

For example, the user has sleep problems due to snoring sounds. By using the hearable, the user may then sleep better again, which has a stress-reducing effect.

For example, the user wears the hearable during sleep. He/she switches the hearable into the sleep mode, which suppresses all snoring sounds. After sleeping, he/she turns the hearable off again.

Alternatively, other sounds such as construction noise, noise of a lawnmower, or the like, can be suppressed during sleep.

A further use case of a further embodiment is a diagnosis device for users in everyday life. The hearable records the preferences (e.g. which sound sources are selected, which attenuation/amplification is selected) and creates a profile with tendencies via the duration of use. This data may allow drawing conclusions about changes with respect to the hearing capability. The goal of this is to detect loss of hearing as early as possible.

For example, the user carries the device in his/her everyday life, or in the use cases mentioned, for several months or years. The hearable creates analyses on the basis of the selected setting, and outputs warnings and recommendations to the user.

For example, the user wears the hearable over a long period of time (months to years). The device creates analyses on the basis of hearing preferences, and the device outputs recommendations and warnings in the case of onset loss of hearing.

A further use case of another embodiment is a therapy device and concerns users with hearing damage in everyday life. In the role as a transition device on the way to the hearing device, potential patients are aided as early as possible, and dementia is therefore preventively treated. Other possibilities are the use as a concentration trainer (e.g. for ADHS), the treatment of tinnitus, and stress reduction.

For example, the listener has hearing problems or attention deficits and uses the hearable temporarily/on an interim basis as a hearing device. Depending on the hearing problem, it is mitigated by the hearable, for example by: amplification of all signals (hardness of hearing), high selectivity for preferred sound sources (attention deficits), reproduction of therapy sounds (treatment of tinnitus).

The user selects independently, or on advice of a doctor, a form of therapy and makes the preferred adjustments, and the hearable carries out the selected therapy.

Alternatively, the hearable detects hearing problems from UC-PRO1, and the hearable automatically adapts the reproduction on the basis of the detected problems and informs the user.

A further use case of a further embodiment is the work in the public sector and concerns employees in the public sector. Employees in the public sector (hospitals, pediatricians, airport counters, educators, restaurant industry, service counters, etc.) that are subject to a high level of noise during their work wear a hearable to emphasize the speech of one person or only a few people to better communicate and for better safety at work, e.g. through the reduction of stress.

For example, employees are subjected to a high level of noise in their working environment, and, despite the background noise, have to talk to clients, patients, or colleagues without being able to switch to calmer environments. Hospital employees are subject to a high level of noise through sounds and beeping noises of medical devices (or any other work related noise) and still have to be able to communicate with patients or colleagues. Pediatricians and educators work amidst children's noise, or shouting, and have to be able to talk to the parents. At an airport counter, the employees have difficulties to understand the airline passengers in the case of a high level of noise in the airport concourse. Waiters have difficulties to hear the orders of their patrons in the noise in well-visited restaurants. Then, e.g., the user turns the voice selection off, and the hearable no longer amplifies the voice(s).

For example, a person turns the mounted hearable on. The user sets the hearable to voice selection of nearby voices, and the hearable amplifies the nearest voice, or a few voices nearby, and simultaneously suppresses background noise. The user then better understands the relevant voice(s).

Alternatively, a person sets the hearable to continuous noise suppression. The user turns on the function to detect available voices and to then amplify the same. Thus, the user may continue to work at a lower level of noise. When being directly addressed from a vicinity of x meters, the hearable then amplifies the voice(s). Thus, the user may converse with the other person(s) at a low level of noise. After the conversation, the hearable switches back to the noise suppression mode, and after work, the user turns the hearable off again.

Another use case of another embodiment is the transport of passengers, and concerns users in a motor vehicle for the transport of passengers. For example, a user and driver of a passenger transporter would like to be distracted as little as possible by the passengers during the drive. Even though the passengers are the main source of disturbance, communication with them is necessary from time to time.

For example, a user, or driver, and the sources of disturbance are located at fixed positions within the motor vehicle. The user is static with respect to the reference system, however, the vehicle itself is moving. This needs an adapted tracking solution. Thus, sounds and conversations of the passengers are suppressed acoustically by default, unless communication is to take place.

For example, the hearable suppresses disturbing noise of the passengers by default. The user may manually cancel the suppression through an appropriate control possibility (speech recognition, button in the vehicle). Here, the hearable adapts the audio reproduction according to the selection.

Alternatively, the hearable detects that a passenger actively talks to the driver, and deactivates the noise suppression temporarily.

Another use case of a further embodiment is school and education, and concerns teachers and students in class. In an example, the hearable has two roles, wherein the functions of the devices are partially coupled. The device of the teacher/speaker suppresses disturbing noise and amplifies speech/questions from the students. In addition, the hearables of the listeners may be controlled through the device of the teacher. Thus, particularly important content may be emphasized without having to speak more loudly. The students may set their hearables so as to be able to better understand the teachers and to tune out disturbing classmates.

For example, teachers and students are located in defined areas in closed spaces (this is the rule). If all devices are coupled with each other, the relative positions are exchangeable, which in turn simplifies the source separation. The selected sound source is acoustically emphasized until the user (teacher/student) cancels the selection, or until warning signals interrupt the function of the device.

For example, a teacher, or speaker, presents content, and the device suppresses disturbing noise. The teacher wants to hear a question of a student, and changes the focus of the hearable to the person having the question (automatically or via an appropriate control possibility). After the communication, all sounds are again suppressed. In addition, it may be provided that, e.g., a student feeling disturbed by classmates tunes them out acoustically. For example, in addition, a student sitting far away from the teacher may amplify the teacher's voice.

Alternatively, e.g., devices of teachers and students may be coupled. Selectivity of the student devices may be temporarily controlled via the teacher device. In case of particularly important content, the teacher changes the selectivity of the student devices in order to amplify his/her voice.

A further use case of another embodiment is the military, and concerns soldiers. On the one hand, verbal communication between soldiers in the field takes place via radio and, on the other hand, via shouts and direct contact. Radio is mostly used if communication is to take place between different units and subgroups. A predetermined radio etiquette is often used. Shouts and direct contact mostly take place to communicate within squads or a group. During the soldiers' mission, there may be difficult acoustical conditions (for example, screaming people, noise of weapons, bad weather) that may impair both communication routes. A radio setup with earphones is often part of the equipment of a soldier. Beside the purpose of audio reproduction, they also provide protective functions against greater levels of sound pressure. These devices are often equipped with microphones in order to bring environmental signals to the ears of the carrier. Active noise suppression is also part of such systems. Enhancement/extension of the functional scope enables shouts and direct contact of soldiers in a noisy environment by means of intelligent attenuation of the disturbing noise and selective emphasis of speech with a directional reproduction. To this end, the relative positions of the soldier in the room/field have to be known. In addition, speech signals and disturbing noise have to be separated from one another spatially and by content. The system has to be able to handle high SNR levels from low whispering to screaming and explosion sounds as well. The advantages of such a system are as follows: verbal communication between soldiers in noisy environments, maintaining a hearing protection, abandonability of radio etiquette, interception security (since it is not a radio solution).

For example, shouts and direct contact between soldiers on mission may be complicated due to disturbing noise. This problem is currently addressed by radio solutions in the near field and for larger distances. The new system enables shouts and direct contact in the near field by intelligent and spatial emphasis of the respective speaker and attenuation of the ambient noise.

For example, the soldier is on mission. Shouts and speech are automatically detected and the system amplifies them with a simultaneous attenuation of the background noise. The system adapts the spatial audio reproduction in order to be able to well understand the target sound source.

Alternatively, e.g., the system may know the soldiers of a group. Only audio signals of these group members are let through.

A further use case of a further embodiment concerns security personnel and security guards. Thus, e.g., the hearable may be used in confusing major events (celebrations, protests) for preemptive detection of crimes. The selectivity of the hearable is controlled by keywords, e.g. cries for help or calls to violence. This presupposes content analysis of the audio signal (e.g. speech recognition).

For example, the security guard is surrounded by many loud sound sources, where the guard and all sound sources may be in movement. Someone calling for help cannot be heard or only to a limited extent (bad SNR) under normal hearing conditions. The sound source selected manually or automatically is acoustically emphasized until the user cancels the selection. Optionally, a virtual sound object is placed at the position/direction of the sound source of interest so as to be able to easily find the location (e.g. for the case of a one-off call for help).

For example, the hearable detects sound sources with potential sources of danger. A security guard selects which sound source, or which event, he/she wishes to follow (e.g. through selection on a tablet). Subsequently, the hearable adapts the audio reproduction so as to be able to well understand and locate the sound source even in the case of disturbing noise.

Alternatively, e.g., if the target sound source is silent, a localization signal towards/in the distance of the source may be placed.

Another use case of another embodiment is the communication on stage, and concerns musicians. On stages, in rehearsals or concerts (e.g. band, orchestra, choir, musical), single instrument (groups) might not be heard due to difficult acoustical conditions, even though they were still heard in other environments. This impairs the interaction since important (accompanying) voices are no longer perceivable. The hearable may emphasize these voice(s) and render them hearable again, and may therefore improve, or ensure, the interaction of the individual musicians. With the use, the noise exposure of individual musicians could be reduced, and loss of hearing could be prevented, e.g. by attenuating the drums, and the musicians could hear all the important things at the same time.

For example, a musician without a hearable no longer hears at least one other voice on stage. In this case, the hearable may be used. After the end of the rehearsal, or the concert, the user takes off the hearable after turning it off.

In an example, the user turns on the hearable. The user selects one or more desired music instruments that are to be amplified. When making music together, the selected music instrument is amplified and therefore made audible again by the hearable. After making music, the user turns off the hearable again.

In an alternative example, the user turns on the hearable. The user selects the desired music instrument whose volume has to be reduced. When making music together, the volume of the selected music instrument is reduced by the hearable so that the user can hear it only with a moderate volume.

For example, music instrument profiles can be stored in the hearable.

Another use case of a further embodiment is source separation as a software module for hearing devices in the sense of an eco-system, and concerns manufacturers of hearing devices, or users of hearing devices. Manufacturers may use source separation as an additional tool for their hearing devices and may offer it to customers. Thus, hearing devices could also profit from the development. A license model for other markets/devices (headphones, mobile phones, etc.) is also conceivable.

For example, users of hearing device have difficulties to separate different sources in a complex auditory situation, e.g. to focus on a certain speaker. To be able to selectively hear even without external additional systems (e.g. transfer of signals from mobile radio sets via Bluetooth, selective signal transfer in classrooms via FM equipment or inductive hearing equipment), the user uses a hearing device with the additional function for selective hearing. Thus, even without external efforts, the user may focus on individual sources through source separation. At the end, the user turns off the additional function and continues to hear normally with the hearing device.

For example, a hearing device user acquires a new hearing device with an integrated additional function for selective hearing. The user sets the function for selective hearing at the hearing device. Then, the user selects a profile (e.g. amplify the loudest/nearest source, amplify speech recognition of certain voices of the personal surroundings (such as in UC-CE5—major events). The hearing device amplifies the respective source(s) according to the set profile, and simultaneously suppresses background noise upon demand, and the user of the hearing device hears individual sources from the complex auditory scene instead of just "noise"/a clutter of acoustical sources.

Alternatively, the hearing device user acquires the additional function for selective hearing as a software, or the like, for his/her own hearing device. The user installs the additional function for his/her hearing device. Then, the user sets the function for selective hearing at the hearing device. The user selects a profile (amplify the loudest/nearest source, amplify voice recognition of certain voices from the personal surroundings (such as in UC-CE5— major events)), and the hearing device amplifies the respective source(s) according to the set profile, and simultaneously suppresses background noise upon demand. In this case, the hearing device user hears individual sources from the complex auditory scene instead of just "noise"/a clutter of acoustical sources.

For example, the hearable may provide storable voice profiles.

A further use case of a further embodiment is professional sports and concerns athletes in competitions. In sports such as biathlon, triathlon, cycling, marathon, etc., professional athletes rely on the information of their coaches or the communication with teammates. However, there are also situations in which they want to protect themselves against loud sounds (shooting in biathlon, loud cheers, party horns, etc.) in order to be able to concentrate. The hearable could be adapted for the respective sport/athlete so as to enable a fully automatic selection of relevant sound sources (detection of certain voices, volume limitation for typical disturbing noise).

For example, the user could be very mobile, and the type of the disturbing noise depends on the sport. Due to the intensive physical strain, control of the device by the athlete is not possible or only to a limited extent. However, in most sports, there is a predetermined procedure (biathlon: running, shooting), and the important communication partners (trainers, teammates) can be defined in advance. Noise is suppressed in general or in certain phases of the activity. The communication between the athlete and the teammates and the coach is emphasized.

For example, the athlete uses a hearable that is specifically adjusted to the type of sport. The hearable suppresses disturbing noise fully automatically (pre-adjusted), particularly in situations where a high degree of attention is needed in the respective type of sport. In addition, the hearable emphasizes the trainer and team members fully automatically (pre-adjusted) when they are in hearing range.

A further use case of a further embodiment is aural training and concerns music students, professional musicians, hobby musicians. For music rehearsals (e.g. in an orchestra, in a band, in an ensemble, in music lessons), a hearable is selectively used to be able to track individual voices in a filtered way. Especially in the beginning of rehearsals, it is helpful to listen to final recordings of the pieces and to track one's own voice. Depending on the composition, the voices in the background cannot be heard well since one just hears the voices in the foreground. With the hearable, one could selectively emphasize a voice on the basis of the instrument, or the like, so as to be able to practice in a more targeted way.

(Aspiring) music students may also use the hearable to train their aural capability in order to selectively prepare for entrance examinations by minimizing individual emphasis step by step until they finally extract the individual voices from complex pieces without help.

A further possible use case is karaoke, e.g. if Singstar or the like is not available nearby. The singing voice(s) may be suppressed from a piece of music on demand in order to only hear the instrumental version to sign karaoke.

For example, a musician starts to learn a voice from a musical piece. He/she listens to the recording of the piece of music through a CD player or any other reproduction medium. If the user is done practicing, he/she turns the hearable off again.

In an example, the user turns the hearable on. He/she selects the desired music instrument to be amplified. When listening to the piece of music, the hearable amplifies the voice(s) of the music instrument, lowers the volume of the remaining music instruments, and the user can therefore better track his/her own voice.

In an alternative example, the user turns the hearable on. He/she selects the desired music instrument to be suppressed. When listening to the piece of music, the voice(s) of the selected piece of music is/are suppressed so that only the remaining voices can be heard. The user can then practice the voice on the own instrument with the other voices without being distracted by the voice from the recording.

In the examples, the hearable may provide for stored musical instrument profiles.

Another use case of another embodiment is safety at work, and concerns workers in loud environments. Workers in loud environments such as machinery halls or on construction sites have to protect themselves against noise, but they also have to be able to perceive warning signals and communicate with colleagues.

For example, the user is located in a very loud environment, and the target sound sources (warning signals, colleagues) might be significantly softer than the disturbing noise. The user may be mobile; however, the disturbing noise is often stationary. Like with hearing protection, noise is permanently lowered and the hearable emphasizes the warning signal fully automatically. Communication with colleagues is ensured by the amplification of speaker sources.

For example, the user is at work and uses the hearable as a hearing protection. Warning signals (e.g. a fire alarm) are acoustically emphasized, and the user stops his/her work, if necessary.

Alternatively, e.g., the user is at work and uses the hearable as a hearing protection. If there is a need for communication with colleagues, the communication partner is selected and acoustically emphasized with the help of appropriate interfaces (here for example: eye control).

Another use case of a further embodiment is source separation as a software module for live translators, and concerns users of a live translator. Live translators translate spoken foreign languages in real time and may profit from an upstream software module for source separation. Especially in the case where several speakers are present, the software module can extract the target speaker and potentially improve the translation.

For example, the software module is part of a live translator (dedicated device or app on a smartphone). For example, the user can select the target speaker through the display of the device. It is advantageous that the user and the target sound source do not move or only move a little for the time of the translation. The selected sound source position is acoustically emphasized and therefore potentially improves the translation.

For example, a user wishes to have a conversation in a foreign language or wishes to listen to a speaker of a foreign language. The user selects the target speaker through an appropriate interface (e.g: GUI on a display), and the software module optimizes the audio recording for further use in the translator.

A further use case of another embodiment is safety at work of relief forces, and concerns firefighters, civil protection, police forces, emergency services. For relief forces, good communication is essential to successfully handle a mission. It is often not possible for the relief forces to carry hearing protection, despite loud ambient noise, since this would render communication impossible. For example, firefighters have to precisely communicate orders and be able to understand them, e.g. despite loud motor sounds, which partly takes place via radios. Thus, relief forces are subject to great noise exposure, where hearing protection ordinances cannot be adhered. On the one hand, a hearable would provide hearing protection for the relief forces and, on the other hand, would still enable communication between the relief forces. Furthermore, with the help of the hearable, relief forces are not decoupled acoustically from the environment when carrying helmets/protection equipment and may therefore be able to offer better support. They can better communicate and are also able to better estimate dangers for themselves (e.g. hearing the type of fire occurring).

For example, the user is subject to strong ambient noise and can therefore not wear hearing protection and still has to be able to communicate with others. He/she uses the hearable. After the mission is done or the situation of danger is over, the user takes the hearable off again.

For example, the user wears the hearable during a mission. He/she turns the hearable on. The hearable suppresses ambient noise and amplifies the speech of colleagues and other speakers nearby (e.g. fire victims).

Alternatively, the user wears the hearable during a mission. He/she turns the hearable on, and the hearable suppresses ambient noise and amplifies the speech of colleagues via radio.

Where applicable, the hearable is specially designed to meet a structural suitability for operations in accordance with an operational specification. Possibly, the hearable comprises an interface to a radio device.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier. In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile.

A further embodiment of the inventive method thus is a data stream or a sequence of signals representing the computer program for performing any of the methods described herein. The data stream or the sequence of signals may be configured, for example, to be transmitted via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

The above-described embodiments merely represent an illustration of the principles of the present invention. It is understood that other persons skilled in the art will appreciate modifications and variations of the arrangements and details described herein. This is why it is intended that the invention be limited only by the scope of the following claims rather than by the specific details that have been presented herein by means of the description and the discussion of the embodiments.

REFERENCES

[1] V. Valimaki, A. Franck, J. Ramo, H. Gamper, and L. Savioja, "Assisted listening using a headset: Enhancing audio perception in real, augmented, and virtual environments," IEEE Signal Processing Magazine, volume 32, no. 2, pp. 92-99, March 2015.

[2] K. Brandenburg, E. Cano, F. Klein, T. Köllmer, H. Lukashevich, A. Neidhardt, U. Sloma, and S. Werner, "Plausible augmentation of auditory scenes using dynamic binaural synthesis for personalized auditory realities," in Proc. of AES International Conference on Audio for Virtual and Augmented Reality, August 2018.

[3] S. Argentieri, P. Dans, and P. Soures, "A survey on sound source localization in robotics: From binaural to array processing methods," Computer Speech Language, volume 34, no. 1, pp. 87-112, 2015.

[4] D. FitzGerald, A. Liutkus, and R. Badeau, "Projection-based demixing of spatial audio," IEEE/ACM Trans. on Audio, Speech, and Language Processing, volume 24, no. 9, pp. 1560-1572, 2016.

[5] E. Cano, D. FitzGerald, A. Liutkus, M. D. Plumbley, and F. Stöter, "Musical source separation: An introduction," IEEE Signal Processing Magazine, volume 36, no. 1, pp. 31-40, January 2019.

[6] S. Gannot, E. Vincent, S. Markovich-Golan, and A. Ozerov, "A consolidated perspective on multimicrophone speech enhancement and source separation," IEEE/ACM Transactions on Audio, Speech, and Language Processing, volume 25, no. 4, pp. 692-730, April 2017.

[7] E. Cano, J. Nowak, and S. Grollmisch, "Exploring sound source separation for acoustic condition monitoring in industrial scenarios," in Proc. of 25th European Signal Processing Conference (EUSIPCO), August 2017, pp. 2264-2268.

[8] T. Gerkmann, M. Krawczyk-Becker, and J. Le Roux, "Phase processing for single-channel speech enhancement: History and recent advances," IEEE Signal Processing Magazine, volume 32, no. 2, pp. 55-66, March 2015.

[9] E. Vincent, T. Virtanen, and S. Gannot, Audio Source Separation and Speech Enhancement. Wiley, 2018.

[10] D. Matz, E. Cano, and J. Abeßer, "New sonorities for early jazz recordings using sound source separation and automatic mixing tools," in Proc. of the 16th International Society for Music Information Retrieval Conference. Malaga, Spain: ISMIR, October 2015, pp. 749-755.

[11] S. M. Kuo and D. R. Morgan, "Active noise control: a tutorial review," Proceedings of the IEEE, volume 87, no. 6, pp. 943-973, June 1999.

[12] A. McPherson, R. Jack, and G. Moro, "Action-sound latency: Are our tools fast enough?" in Proceedings of the International Conference on New Interfaces for Musical Expression, July 2016.

[13] C. Rottondi, C. Chafe, C. Allocchio, and A. Sarti, "An overview on networked music performance technologies," IEEE Access, volume 4, pp. 8823-8843, 2016.

[14] S. Liebich, J. Fabry, P. Jax, and P. Vary, "Signal processing challenges for active noise cancellation headphones," in Speech Communication; 13th ITG-Symposium, October 2018, pp. 1-5.

[15] E. Cano, J. Liebetrau, D. Fitzgerald, and K. Brandenburg, "The dimensions of perceptual quality of sound source separation," in Proc. of IEEE International Conference on Acoustics, Speech and Signal Processing (ICASSP), April 2018, pp. 601-605.

[16] P. M. Delgado and J. Herre, "Objective assessment of spatial audio quality using directional loudness maps," in Proc. of IEEE International Conference on Acoustics, Speech and Signal Processing (ICASSP), May 2019, pp. 621-625.

[17] C. H. Taal, R. C. Hendriks, R. Heusdens, and J. Jensen, "An algorithm for intelligibility prediction of time-frequency weighted noisy speech," IEEE Transactions on Audio, Speech, and Language Processing, volume 19, no. 7, pp. 2125-2136, September 2011.

[18] M. D. Plumbley, C. Kroos, J. P. Bello, G. Richard, D. P. Ellis, and A. Mesaros, Proceedings of the Detection and Classification of Acoustic Scenes and Events 2018 Workshop (DCASE2018). Tampere University of Technology. Laboratory of Signal Processing, 2018.

[19] R. Serizel, N. Turpault, H. Eghbal-Zadeh, and A. Parag Shah, "Large-Scale Weakly Labeled Semi-Supervised Sound Event Detection in Domestic Environments," July 2018, submitted to DCASE2018 Workshop.

[20] L. JiaKai, "Mean teacher convolution system for dcase 2018 task 4," DCASE2018 Challenge, Tech. Rep., September 2018.

[21] G. Parascandolo, H. Huttunen, and T. Virtanen, "Recurrent neural networks for polyphonic sound event detection in real life recordings," in Proc. of IEEE International Conference on Acoustics, Speech and Signal Processing (ICASSP), March 2016, pp. 6440-6444.

[22] E. C, Çakir and T. Virtanen, "End-to-end polyphonic sound event detection using convolutional recurrent neural networks with learned time-frequency representation input," in Proc. of International Joint Conference on Neural Networks (IJCNN), July 2018, pp. 1-7.

[23] Y. Xu, Q. Kong, W. Wang, and M. D. Plumbley, "Large-Scale Weakly Supervised Audio Classification Using Gated Convolutional Neural Network," in Proceedings of the IEEE International Conference on Acoustics, Speech and Signal Processing (ICASSP), Calgary, AB, Canada, 2018, pp. 121-125.

[24] B. Frenay and M. Verleysen, "Classification in the presence of label noise: A survey," IEEE Transactions on Neural Networks and Learning Systems, volume 25, no. 5, pp. 845-869, May 2014.

[25] E. Fonseca, M. Plakal, D. P. W. Ellis, F. Font, X. Favory, and X. Serra, "Learning sound event classifiers from web audio with noisy labels," in Proceedings of IEEE International Conference on Acoustics, Speech and Signal Processing (ICASSP), Brighton, UK, 2019.

[26] M. Dorfer and G. Widmer, "Training general-purpose audio tagging networks with noisy labels and iterative self-verification," in Proceedings of the Detection and Classification of Acoustic Scenes and Events 2018 Workshop (DCASE2018), Surrey, UK, 2018.

[27] S. Adavanne, A. Politis, J. Nikunen, and T. Virtanen, "Sound event localization and detection of overlapping sources using convolutional recurrent neural networks," IEEE Journal of Selected Topics in Signal Processing, pp. 1-1, 2018.

[28] Y. Jung, Y. Kim, Y. Choi, and H. Kim, "Joint learning using denoising variational autoencoders for voice activity detection," in Proc. of Interspeech, September 2018, pp. 1210-1214.

[29] F. Eyben, F. Weninger, S. Squartini, and B. Schuller, "Real-life voice activity detection with LSTM recurrent neural networks and an application to hollywood movies," in Proc. of IEEE International Conference on Acoustics, Speech and Signal Processing, May 2013, pp. 483-487.

[30] R. Zazo-Candil, T. N. Sainath, G. Simko, and C. Parada, "Feature learning with raw-waveform CLDNNs for voice activity detection," in Proc. of INTERSPEECH, 2016.

[31] M. McLaren, Y. Lei, and L. Ferrer, "Advances in deep neural network approaches to speaker recognition," in Proc. of IEEE International Conference on Acoustics, Speech and Signal Processing (ICASSP), April 2015, pp. 4814-4818.

[32] D. Snyder, D. Garcia-Romero, G. Sell, D. Povey, and S. Khudanpur, "X-vectors: Robust DNN embeddings for speaker recognition," in Proc. of IEEE International Conference on Acoustics, Speech and Signal Processing (ICASSP), April 2018, pp. 5329-5333.

[33] M. McLaren, D. Castán, M. K. Nandwana, L. Ferrer, and E. Yilmaz, "How to train your speaker embeddings extractor," in Odyssey, 2018.

[34] S. O. Sadjadi, J. W. Pelecanos, and S. Ganapathy, "The IBM speaker recognition system: Recent advances and error analysis," in Proc. of Interspeech, 2016, pp. 3633-3637.

[35] Y. Han, J. Kim, and K. Lee, "Deep convolutional neural networks for predominant instrument recognition in polyphonic music," IEEE/ACM Transactions on Audio, Speech, and Language Processing, volume 25, no. 1, pp. 208-221, January 2017.

[36] V. Lonstanlen and C.-E. Cella, "Deep convolutional networks on the pitch spiral for musical instrument recognition," in Proceedings of the 17th International Society for Music Information Retrieval Conference. New York, USA: ISMIR, 2016, pp. 612-618.

[37] S. Gururani, C. Summers, and A. Lerch, "Instrument activity detection in polyphonic music using deep neural networks," in Proceedings of the 19th International Society for Music Information Retrieval Conference. Paris, France: ISMIR, September 2018, pp. 569-576.

[38] J. Schlütter and B. Lehner, "Zero mean convolutions for level-invariant singing voice detection," in Proceedings of the 19th International Society for Music Information Retrieval Conference. Paris, France: ISMIR, September 2018, pp. 321-326.

[39] S. Delikaris-Manias, D. Pavlidi, A. Mouchtaris, and V. Pulkki, "DOA estimation with histogram analysis of spatially constrained active intensity vectors," in Proc. of IEEE International Conference on Acoustics, Speech and Signal Processing (ICASSP), March 2017, pp. 526-530.

[40] S. Chakrabarty and E. A. P. Habets, "Multi-speaker DOA estimation using deep convolutional networks trained with noise signals," IEEE Journal of Selected Topics in Signal Processing, volume 13, no. 1, pp. 8-21, March 2019.

[41] X. Li, L. Girin, R. Horaud, and S. Gannot, "Multiple-speaker localization based on direct-path features and likelihood maximization with spatial sparsity regularization," IEEE/ACM Transactions on Audio, Speech, and Language Processing, volume 25, no. 10, pp. 1997-2012, October 2017.
[42] F. Grondin and F. Michaud, "Lightweight and optimized sound source localization and tracking methods for open and closed microphone array configurations," Robotics and Autonomous Systems, volume 113, pp. 63-80, 2019.
[43] D. Yook, T. Lee, and Y. Cho, "Fast sound source localization using two-level search space clustering," IEEE Transactions on Cybernetics, volume 46, no. 1, pp. 20-26, January 2016.
[44] D. Pavlidi, A. Griffin, M. Puigt, and A. Mouchtaris, "Real-time multiple sound source localization and counting using a circular microphone array," IEEE Transactions on Audio, Speech, and Language Processing, volume 21, no. 10, pp. 2193-2206, October 2013.
[45] P. Vecchiotti, N. Ma, S. Squartini, and G. J. Brown, "End-to-end binaural sound localisation from the raw waveform," in Proc. of IEEE International Conference on Acoustics, Speech and Signal Processing (ICASSP), May 2019, pp. 451-455.
[46] Y. Luo, Z. Chen, and N. Mesgarani, "Speaker-independent speech separation with deep attractor network," IEEE/ACM Transactions on Audio, Speech, and Language Processing, volume 26, no. 4, pp. 787-796, April 2018.
[47] Z. Wang, J. Le Roux, and J. R. Hershey, "Multi-channel deep clustering: Discriminative spectral and spatial embeddings for speaker-independent speech separation," in Proc. of IEEE International Conference on Acoustics, Speech and Signal Processing (ICASSP), April 2018, pp. 1-5.
[48] G. Naithani, T. Barker, G. Parascandolo, L. BramslŁw, N. H. Pontoppidan, and T. Virtanen, "Low latency sound source separation using convolutional recurrent neural networks," in Proc. of IEEE Workshop on Applications of Signal Processing to Audio and Acoustics (WASPAA), October 2017, pp. 71-75.
[49] M. Sunohara, C. Haruta, and N. Ono, "Low-latency real-time blind source separation for hearing aids based on time-domain implementation of online independent vector analysis with truncation of non-causal components," in Proc. of IEEE International Conference on Acoustics, Speech and Signal Processing (ICASSP), March 2017, pp. 216-220.
[50] Y. Luo and N. Mesgarani, "TaSNet: Time-domain audio separation network for real-time, single-channel speech separation," in Proc. of IEEE International Conference on Acoustics, Speech and Signal Processing (ICASSP), April 2018, pp. 696-700.
[51] J. Chua, G. Wang, and W. B. Kleijn, "Convolutive blind source separation with low latency," in Proc. of IEEE International Workshop on Acoustic Signal Enhancement (IWAENC), September 2016, pp. 1-5.
[52] Z. Rafii, A. Liutkus, F. Stöter, S. I. Mimilakis, D. FitzGerald, and B. Pardo, "An overview of lead and accompaniment separation in music," IEEE/ACM Transactions on Audio, Speech, and Language Processing, volume 26, no. 8, pp. 1307-1335, August 2018.
[53] F.-R. Stöter, A. Liutkus, and N. Ito, "The 2018 signal separation evaluation campaign," in Latent Variable Analysis and Signal Separation, Y. Deville, S. Gannot, R. Mason, M. D. Plumbley, and D. Ward, Eds. Cham: Springer International Publishing, 2018, pp. 293-305.
[54] J.-L. Durrieu, B. David, and G. Richard, "A musically motivated midlevel representation for pitch estimation and musical audio source separation," Selected Topics in Signal Processing, IEEE Journal of, volume 5, no. 6, pp. 1180-1191, October 2011.
[55] S. Uhlich, M. Porcu, F. Giron, M. Enenkl, T. Kemp, N. Takahashi, and Y. Mitsufuji, "Improving music source separation based on deep neural networks through data augmentation and network blending," in Proc. of IEEE International Conference on Acoustics, Speech and Signal Processing (ICASSP), 2017.
[56] P. N. Samarasinghe, W. Zhang, and T. D. Abhayapala, "Recent advances in active noise control inside automobile cabins: Toward quieter cars," IEEE Signal Processing Magazine, volume 33, no. 6, pp. 61-73, November 2016.
[56] S. Papini, R. L. Pinto, E. B. Medeiros, and F. B. Coelho, "Hybrid approach to noise control of industrial exhaust systems," Applied Acoustics, volume 125, pp. 102-112, 2017.
[58] J. Zhang, T. D. Abhayapala, W. Zhang, P. N. Samarasinghe, and S. Jiang, "Active noise control over space: A wave domain approach," IEEE/ACM Transactions on Audio, Speech, and Language Processing, volume 26, no. 4, pp. 774-786, April 2018.
[59] X. Lu, Y. Tsao, S. Matsuda, and C. Hori, "Speech enhancement based on deep denoising autoencoder," in Proc. of Interspeech, 2013.
[60] Y. Xu, J. Du, L. Dai, and C. Lee, "A regression approach to speech enhancement based on deep neural networks," IEEE/ACM Transactions on Audio, Speech, and Language Processing, volume 23, no. 1, pp. 7-19, January 2015.
[61] S. Pascual, A. Bonafonte, and J. Serrà, "SEGAN: speech enhancement generative adversarial network," in Proc. of Interspeech, August 2017, pp. 3642-3646.
[62] F. Weninger, H. Erdogan, S. Watanabe, E. Vincent, J. Le Roux, J. R. Hershey, and B. Schuller, "Speech enhancement with LSTM recurrent neural networks and its application to noise-robust ASR," in Latent Variable Analysis and Signal Separation, E. Vincent, A. Yeredor, Z. Koldovský, and P. Tichayský, Eds. Cham: Springer International Publishing, 2015, pp. 91-99.
[63] H. Wierstorf, D. Ward, R. Mason, E. M. Grais, C. Hummersone, and M. D. Plumbley, "Perceptual evaluation of source separation for remixing music," in Proc. of Audio Engineering Society Convention 143, October 2017.
[64] J. Pons, J. Janer, T. Rode, and W. Nogueira, "Remixing music using source separation algorithms to improve the musical experience of cochlear implant users," The Journal of the Acoustical Society of America, volume 140, no. 6, pp. 4338-4349, 2016.
[65] Q. Kong, Y. Xu, W. Wang, and M. D. Plumbley, "A joint separation-classification model for sound event detection of weakly labelled data," in Proceedings of IEEE International Conference on Acoustics, Speech and Signal Processing (ICASSP), March 2018.
[66] T. v. Neumann, K. Kinoshita, M. Delcroix, S. Araki, T. Nakatani, and R. Haeb-Umbach, "All-neural online source separation, counting, and diarization for meeting analysis," in Proc. of IEEE International Conference on Acoustics, Speech and Signal Processing (ICASSP), May 2019, pp. 91-95.
[67] S. Gharib, K. Drossos, E. Cakir, D. Serdyuk, and T. Virtanen, "Unsupervised adversarial domain adaptation for acoustic scene classification," in Proceedings of the Detection and Classification of Acoustic Scenes and Events Workshop (DCASE), November 2018, pp. 138-142.

[68] A. Mesaros, T. Heittola, and T. Virtanen, "A multi-device dataset for urban acoustic scene classification," in Proceedings of the Detection and Classification of Acoustic Scenes and Events Workshop, Surrey, UK, 2018.

[69] J. Abeßer, M. Götze, S. Kühnlenz, R. Gräfe, C. Kühn, T. Clauß, H. Lukashevich, "A Distributed Sensor Network for Monitoring Noise Level and Noise Sources in Urban Environments," in Proceedings of the 6th IEEE International Conference on Future Internet of Things and Cloud (FiCloud), Barcelona, Spain, pp. 318-324., 2018.

[70] T. Virtanen, M. D. Plumbley, D. Ellis (Eds.), "Computational Analysis of Sound Scenes and Events," Springer, 2018.

[71] J. Abeßer, S. loannis Mimilakis, R. Gräfe, H. Lukashevich, "Acoustic scene classification by combining autoencoder-based dimensionality reduction and convolutional neural net-works," in Proceedings of the 2nd DCASE Workshop on Detection and Classification of Acoustic Scenes and Events, Munich, Germany, 2017.

[72] A. Avni, J. Ahrens, M. Geierc, S. Spors, H. Wierstorf, B. Rafaely, "Spatial perception of sound fields recorded by spherical microphone arrays with varying spatial resolution," Journal of the Acoustic Society of America, 133(5), pp. 2711-2721, 2013.

[73] E. Cano, D. FitzGerald, K. Brandenburg, "Evaluation of quality of sound source separation algorithms: Human perception vs quantitative metrics," in Proceedings of the 24th European Signal Processing Conference (EUSIPCO), pp. 1758-1762, 2016.

[74] S. Marchand, "Audio scene transformation using informed source separation," The Journal of the Acoustical Society of America, 140(4), p. 3091, 2016.

[75] S. Grollmisch, J. Abeßer, J. Liebetrau, H. Lukashevich, "Sounding industry: Challenges and datasets for industrial sound analysis (ISA)," in Proceedings of the 27th European Signal Processing Conference (EUSIPCO) (submitted), A Coruna, Spain, 2019.

[76] J. Abeßer, M. Müller, "Fundamental frequency contour classification: A comparison between hand-crafted and CNN-based features," in Proceedings of the 44th IEEE International Conference on Acoustics, Speech, and Signal Processing (ICASSP), 2019.

[77] J. Abeßer, S. Balke, M. Müller, "Improving bass saliency estimation using label propagation and transfer learning," in Proceedings of the 19th International Society for Music Information Retrieval Conference (ISMIR), Paris, France, pp. 306-312, 2018.

[78] C.-R. Nagar, J. Abeßer, S. Grollmisch, "Towards CNN-based acoustic modeling of seventh chords for recognition chord recognition," in Proceedings of the 16th Sound & Music Computing Conference (SMC) (submitted), Malaga, Spain, 2019.

[79] J. S. Gómez, J. Abeßer, E. Cano, "Jazz solo instrument classification with convolutional neural networks, source separation, and transfer learning", in Proceedings of the 19th International Society for Music Information Retrieval Conference (ISMIR), Paris, France, pp. 577-584, 2018.

[80] J. R. Hershey, Z. Chen, J. Le Roux, S. Watanabe, "Deep clustering: Discriminative embeddings for segmentation and separation," in Proceedings of the IEEE International Conference on Acoustics, Speech and Signal Processing (ICASSP), pp. 31-35, 2016.

[81] E. Cano, G. Schuller, C. Dittmar, "Pitch-informed solo and accompaniment separation towards its use in music education applications", EURASIP Journal on Advances in Signal Processing, 2014:23, pp. 1-19.

[82] S. I. Mimilakis, K. Drossos, J. F. Santos, G. Schuller, T. Virtanen, Y. Bengio, "Monaural Singing Voice Separation with Skip-Filtering Connections and Recurrent Inference of Time-Frequency Mask," in Proceedings of the IEEE International Conference on Acoustics, Speech, and Signal Processing (ICASSP), Calgary, Canada, S.721-725, 2018.

[83] J. F. Gemmeke, D. P. W. Ellis, D. Freedman, A. Jansen, W. Lawrence, R. C. Moore, M. Plakal, M. Ritter, "Audio Set: An ontology and human-labeled dataset for audio events," in Proceedings of the IEEE International Conference on Acoustics, Speech and Signal Processing (ICASSP), New Orleans, USA, 2017.

[84] Kleiner, M. "Acoustics and Audio Technology,". 3rd ed. USA: J. Ross Publishing, 2012.

[85] M. Dickreiter, V. Dittel, W. Hoeg, M. Wöhr, M. "Handbuch der Tonstudiotechnik," A. medienakademie (Eds). 7th edition, Vol. 1., Munich: K. G. Saur Verlag, 2008.

[86] F. Müller, M. Karau. "Transparant hearing," in: CHI '02 Extended Abstracts on Human Factors in Computing Systems (CHI EA '02), Minneapolis, USA, pp. 730-731, April 2002.

[87] L. Vieira. "Super hearing: a study on virtual prototyping for hearables and hearing aids," Master Thesis, Aalborg University, 2018. Available: https://projekter.aau.dk/projekter/files/287515943/MasterThesis_Luis.pdf.

[88] Sennheiser, "AMBEO Smart Headset," [Online]. Available: https://de-de.sennheiser.com/finalstop [Accessed: Mar. 1, 2019].

[89] Orosound "Tilde Earphones" [Online]. Available: https://www.orosound.com/tilde-earphones/[Accessed; Mar. 1, 2019].

[90] Brandenburg, K., Cano Ceron, E., Klein, F., Köllmer, T., Lukashevich, H., Neidhardt, A., Nowak, J., Sloma, U., and Werner, S., "Personalized auditory reality," in 44. Jahrestagung für Akustik (DAGA), Garching bei München, Deutsche Gesellschaft für Akustik (DEGA), 2018.

[91] US 2015 195641 A1, Application date: Jan. 6, 2014; published on Jul. 9, 2015.

The invention claimed is:

1. A system, comprising:

an analyzer for determining a plurality of binaural room impulse responses; and a loudspeaker signal generator for generating at least two loudspeaker signals depending on the plurality of binaural room impulse responses and depending on an audio source signal of at least one audio source, wherein the analyzer is configured to determine the plurality of binaural room impulse responses such that each of the plurality of binaural room impulse responses considers an effect that results from a headphone being worn by a user, wherein the headphone comprises two headphone capsules and at least one microphone for conducting a measurement of sound in each of the two headphone capsules, wherein the at least one microphone for measuring the sound is arranged in each of the two headphone capsules, wherein the analyzer is configured to determine the plurality of binaural room impulse responses by using the measurement of the at least one microphone in each of the two headphone capsules, wherein the at least one microphone in each of the two headphone capsules is configured to, prior to reproduction of the at least two loudspeaker signals by the headphone, generate one or more recordings of a sound situation in a reproduction room, determine an estimation of a raw audio signal of the at least one audio source from the one or more recordings, and determine a binaural room impulse response of the plurality of binaural room impulse responses for the at least one audio source in the reproduction room, and wherein the at least one microphone in each of the two headphone capsules is configured to, during reproduction of the at least two loudspeaker signals by the headphone, generate one or more further recordings of the sound situation in the reproduction room, subtract an augmented signal from these one or more further recordings, determine the estimation of the raw audio signal from one or more audio sources, and determine the binaural room impulse response of the plurality of binaural room impulse responses for the at least one audio source in the reproduction room.

2. The system according to claim 1, wherein the analyzer is configured to determine acoustical room characteristics of the reproduction room and adapt the plurality of binaural room impulse responses depending on the acoustical room characteristics.

3. The system according to claim 1, wherein the at least one microphone is arranged in each of the two headphone capsules for measuring the sound close to an entrance of an ear canal of the user.

4. The system according to claim 1, wherein the system comprises one or more further microphones outside of the two headphone capsules for measuring the sound situation in the reproduction room.

5. The system according to claim 4, wherein the headphone comprises a bracket, and wherein at least one of the one or more further microphones is arranged on the bracket.

6. The system according to claim 1, wherein the loudspeaker signal generator is configured to generate the at least two loudspeaker signals by each of the plurality of binaural room impulse responses being convoluted with the audio source signal.

7. The system according to claim 1, wherein the analyzer is configured to determine at least one of the plurality of binaural room impulse responses depending on a movement of the headphone.

8. The system according to claim 7, wherein the system comprises a sensor to determine a movement of the headphone.

9. A method, comprising:

determining a plurality of binaural room impulse responses;

generating at least two loudspeaker signals depending on the plurality of binaural room impulse responses and depending on an audio source signal of at least one audio source, wherein the plurality of binaural room impulse responses is determined such that each of the plurality of binaural room impulse responses considers an effect that results from a headphone being worn by a user, wherein the headphone comprises two headphone capsules and at least one microphone for conducting a measurement of sound in each of the two headphone capsules, wherein the at least one microphone for measuring the sound is arranged in each of the two headphone capsules, and wherein the plurality of binaural room impulse responses is determined by using the measurement of the at least one microphone in each of the two headphone capsules;

generating, by the at least one microphone in each of the two headphone capsules, prior to reproduction of the at least two loudspeaker signals by the headphone, one or more recordings of a sound situation in a reproduction room, determining an estimation of a raw audio signal of at least one audio source from the one or more recordings, and determining a binaural room impulse response of the plurality of binaural room impulse responses for the at least one audio source in the reproduction room; and generating, by the at least one microphone in each of the two headphone capsules, during reproduction of the at least two loudspeaker signals by the headphone, one or more further recordings of the sound situation in the reproduction room, subtracting an augmented signal from these one or more further recordings, determining the estimation of the raw audio signal from one or more audio sources, and determining the binaural room impulse response of the plurality of binaural room impulse responses for the at least one audio source in the reproduction room.

10. A non-transitory computer readable medium storing a computer program that when executed by a computer performs:

determining a plurality of binaural room impulse responses;

generating at least two loudspeaker signals depending on the plurality of binaural room impulse responses and depending on an audio source signal of at least one audio source, wherein the plurality of binaural room impulse responses is determined such that each of the plurality of binaural room impulse responses considers an effect that results from a headphone being worn by a user, wherein the headphone comprises two headphone capsules and at least one microphone for conducting a measurement of sound in each of the two headphone capsules, and wherein the at least one microphone for measuring the sound is arranged in each of the two headphone capsules, wherein the plurality of binaural room impulse responses is determined by using the measurement of the at least one microphone in each of the two headphone capsules;

generating, by the at least one microphone in each of the two headphone capsules, prior to reproduction of the at least two loudspeaker signals by the headphone, one or more recordings of a sound situation in a reproduction room, determining an estimation of a raw audio signal of at least one audio source from the one or more recordings, and determining a binaural room impulse response of the plurality of binaural room impulse responses for the at least one audio source in the reproduction room; and generating, by the at least one microphone in each of the two headphone capsules, during reproduction of the at least two loudspeaker signals by the headphone, one or more further recordings of the sound situation in the reproduction room, subtracting an augmented signal from these one or more further recordings, determining the estimation of the raw audio signal from one or more audio sources, and determining the binaural room impulse response of the plurality of binaural room impulse responses for the at least one audio source in the reproduction room.

* * * * *